(12) United States Patent
Makiyama et al.

(10) Patent No.: US 8,294,325 B2
(45) Date of Patent: Oct. 23, 2012

(54) STATOR CORE FOR DYNAMO-ELECTRIC MACHINE AND MANUFACTURING METHOD THEREFOR

(75) Inventors: Takahiro Makiyama, Hitachinaka (JP); Toshiya Teramae, Hiratsuka (JP); Keii Ueno, Yokohama (JP); Yuji Enomoto, Hitachi (JP); Yoshihisa Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 12/863,629

(22) PCT Filed: Dec. 9, 2008

(86) PCT No.: PCT/JP2008/072303
§ 371 (c)(1),
(2), (4) Date: Nov. 18, 2010

(87) PCT Pub. No.: WO2009/113215
PCT Pub. Date: Sep. 17, 2009

(65) Prior Publication Data
US 2011/0062817 A1  Mar. 17, 2011

(30) Foreign Application Priority Data

Mar. 12, 2008 (JP) .................................. 2008-063062

(51) Int. Cl.
*H02K 1/06* (2006.01)
(52) U.S. Cl. ................................................ 310/216.054
(58) Field of Classification Search .......... 310/216.001–216.137
See application file for complete search history.

(56) References Cited

U.S. PATENT DOCUMENTS 5,355,045 A * 10/1994 Hisey .................... 310/216.054
7,420,309 B2 * 9/2008 Wakitani et al. ....... 310/216.048

FOREIGN PATENT DOCUMENTS

| JP | 2002-345179 | 11/2002 |
| JP | 2004-229403 | 8/2004 |
| JP | 2005-151785 | 6/2005 |
| JP | 2005-176463 | 6/2005 |
| JP | 2006-280189 | 10/2006 |
| JP | 2006-296188 | 10/2006 |
| JP | 2009-005420 | 1/2009 |
| JP | 2009-005421 | 1/2009 |
| JP | 2009-027904 | 2/2009 |
| JP | 2009-165273 | 7/2009 |
| JP | 2009-219319 | 9/2009 |
| WO | WO 2007/010934 A1 | 1/2007 |

* cited by examiner

*Primary Examiner* — Nguyen N Hanh
(74) *Attorney, Agent, or Firm* — Antonelli, Terry, Stout & Kraus, LLP.

(57) ABSTRACT

A claw-pole type dynamo-electric machine, from which an improvement in productivity of stator winding can be expected, has such as a structure that the whole stator wiring is covered with a magnetic body, and thereby the inductance increases to pose the problem of decreasing a power factor. Disclosed is a stator core of a dynamo-electric machine in which a plurality of stator cores of respective phases are arranged independently in the direction of the rotating shaft of a rotor, the magnetic poles of the stator cores are arranged in the shape of a wave in the circumferential direction of the rotating shaft of a rotor, slots extending in the direction of the rotating shaft are formed between respective magnetic poles, and the stator winding can be arranged in a slot formed on the side of the inner end face of the magnetic pole arranged in the shape of a wave and in the axial direction of the rotating shaft.

13 Claims, 30 Drawing Sheets

STATOR CORE FOR DYNAMO-ELECTRIC MACHINE AND MANUFACTURING METHOD THEREFOR

TECHNICAL FIELD

The present invention relates to a stator core for a dynamo-electric machine having a stator and a rotor, and a manufacturing method therefor.

BACKGROUND ART

The prior art dynamo-electric machine used for example in a motor or a power generator adopted a complex stator winding, which caused drawbacks such as low productivity. Claw-pole type dynamo-electric machines as disclosed in patent document 1 or patent document 2 are known as an example of a dynamo-electric machine having improved productivity.
[Patent document 1] Japanese patent application laid-open publication No. 2006-296188
[Patent document 2] Japanese patent application laid-open publication No. 2005-151785

SUMMARY OF THE INVENTION

Problem to be Solved by the Invention

In a claw-pole motor type dynamo-electric machine as disclosed in patent document 1 or patent document 2, there is a drawback in that the stator winding has high inductance. For example, when the inductance of the stator winding becomes high in a motor or a power generator, the phase difference between the current and the voltage is increased, by which the power factor, which is a principal characteristics of the motor or the power generator, is deterorated.

The object of the present invention is to provide a stator core of a dynamo-electric machine in which the stator productivity is high, and which can reduce the increase of inductance of the stator winding.

SUMMARY OF THE INVENTION

The present invention provides a stator core for a dynamo-electric machine having a rotor supported in a rotatable manner, and a stator having at least two stator cores aligned in a rotating shaft direction of the rotor, each stator core comprising a plurality of magnetic poles of the stator core arranged in a circumferential direction of the rotating shaft of the rotor, and stator core slots formed in an axial direction of the rotating shaft between the respective magnetic poles of the plurality of magnetic poles, wherein the respective magnetic poles arranged in the circumferential direction have end faces in the axial direction of the rotating shaft formed in a shape of a wave with respect to adjacent magnetic poles in the axial direction of the rotating shaft, so that a stator winding can be arranged in the slots formed on the side of the wave-shaped inner end faces of the magnetic poles and in the axial direction of the rotating shaft, and wherein the magnetic poles of the plurality of stator cores arranged in the circumferential direction of the rotating shaft are formed of steel sheets laminated in the axial direction of the rotating shaft.

Further, the present invention provides a manufacturing method of a stator core for a dynamo-electric machine comprising a step one for cutting out a material from a steel sheet, a step two for laminating the material, a step three for joining the material and a step four for forming the material in a shape of a wave, wherein steps one through four are combined to form a plurality of magnetic poles of a stator core in the circumferential direction of a rotating shaft of the dynamo-electric machine, to form slots in an axial direction of the rotating shaft between the respective magnetic poles of the plurality of magnetic poles, and to form end faces in the axial direction of the rotating shaft of the respective magnetic poles arranged in the circumferential direction so that the adjacent magnetic poles are alternately displaced in a shape of a wave in the axial direction of the rotating shaft.

Effect of the Present Invention

The present invention enables to either suppress the increase of the inductance or reduce the inductance of the stator winding.

Further according to preferred embodiments of the present invention, there are no claws extending in the axial direction disposed between the circumferential stator winding and the rotor surface as seen in common claw-pole type stators, so that the stator cores can be manufactured easily in an advantageous manner.

According further to the preferred embodiments of the present invention, there are no claws extending in the rotating shaft direction between the circumferential stator winding and the rotor surface and linked to the stator winding, so that the inductance of the stator winding can be reduced compared to common claw-pole type stators.

Further according to the preferred embodiments of the present invention, the area of the magnetic body surrounding the stator winding 122 is smaller compared to common claw-pole type stators, so that the inductance of the stator winding can be reduced significantly.

According further to the preferred embodiments of the present invention, the stator winding is arranged in the rotating shaft direction and the rotor cores are divided into phase units and aligned in the rotating shaft direction as in common slot teeth dynamo-electric machines, so that the manufacturing of the stator winding is facilitated, and the productivity thereof is effectively improved. According to the preferred embodiment of the present invention, the stator winding is arranged in the rotating shaft direction between the magnetic poles arranged in the circumferential direction, so that the surface of the magnetic poles of the stator opposed to the rotor can be increased compared to common claw-pole type magnetic poles, and the efficiency can be improved.

According further to the preferred embodiments of the present invention, the magnetic poles of the stator are formed by stacking stator cores in the axial direction, so that iron loss caused by eddy current can be cut down significantly.

Even further, since laminated steel sheets are used in the embodiments of the present invention, the mechanical strength of the stator is significantly increased compared to those using power magnetic cores.

Figure 1:
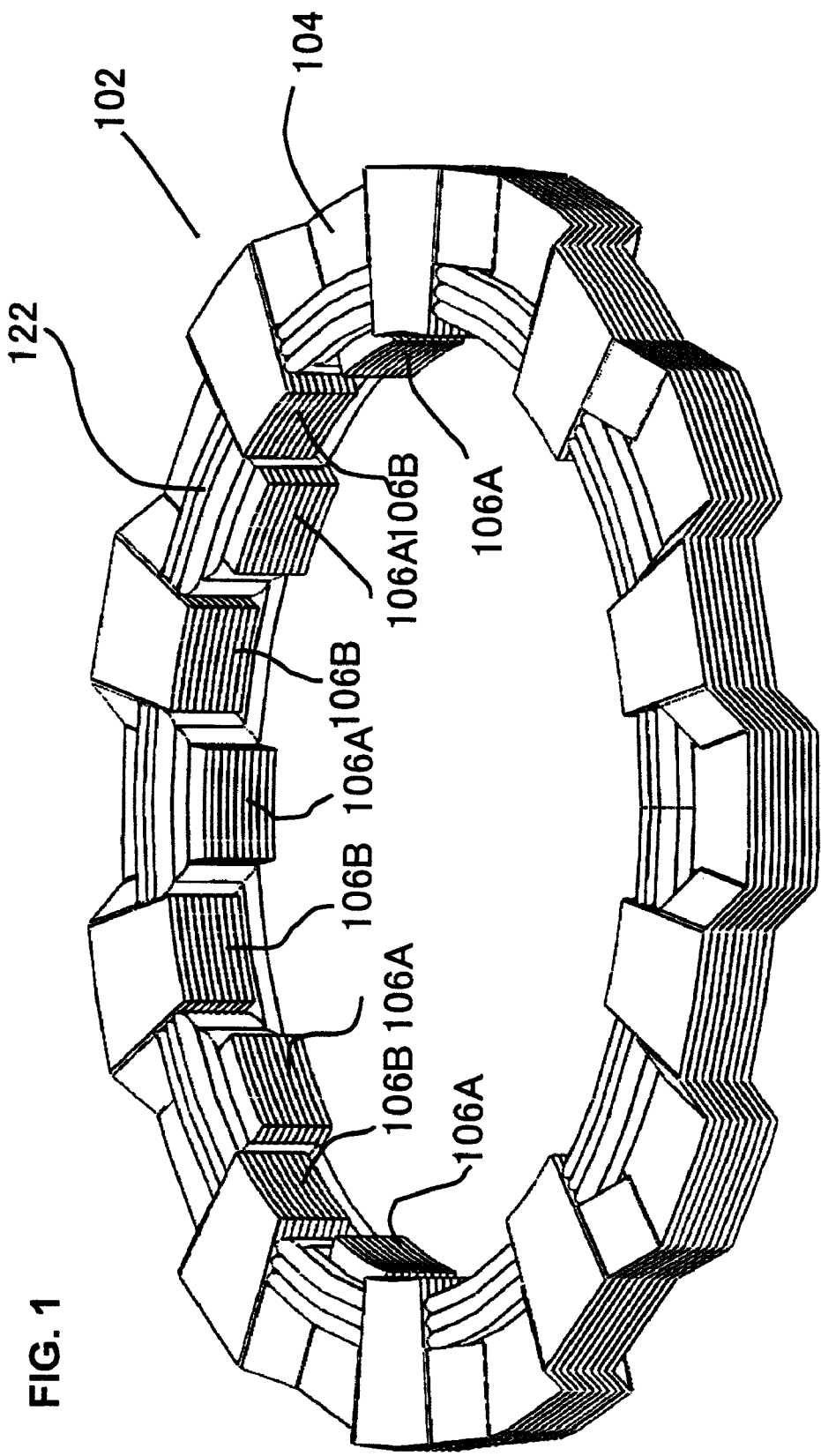
FIG. 1 is a perspective view showing the basic structure of a stator according to a preferred embodiment of the present invention.
Figure 2A:
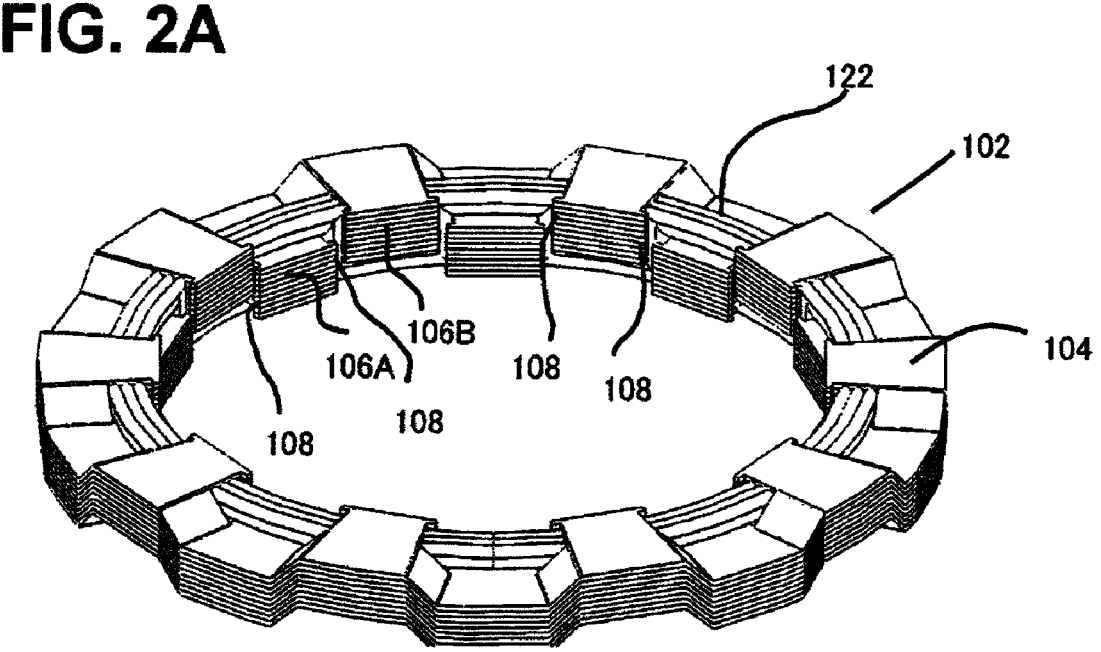
FIG. 2A is a perspective view showing the whole body of the basic structure of the stator according to one example.
Figure 3:
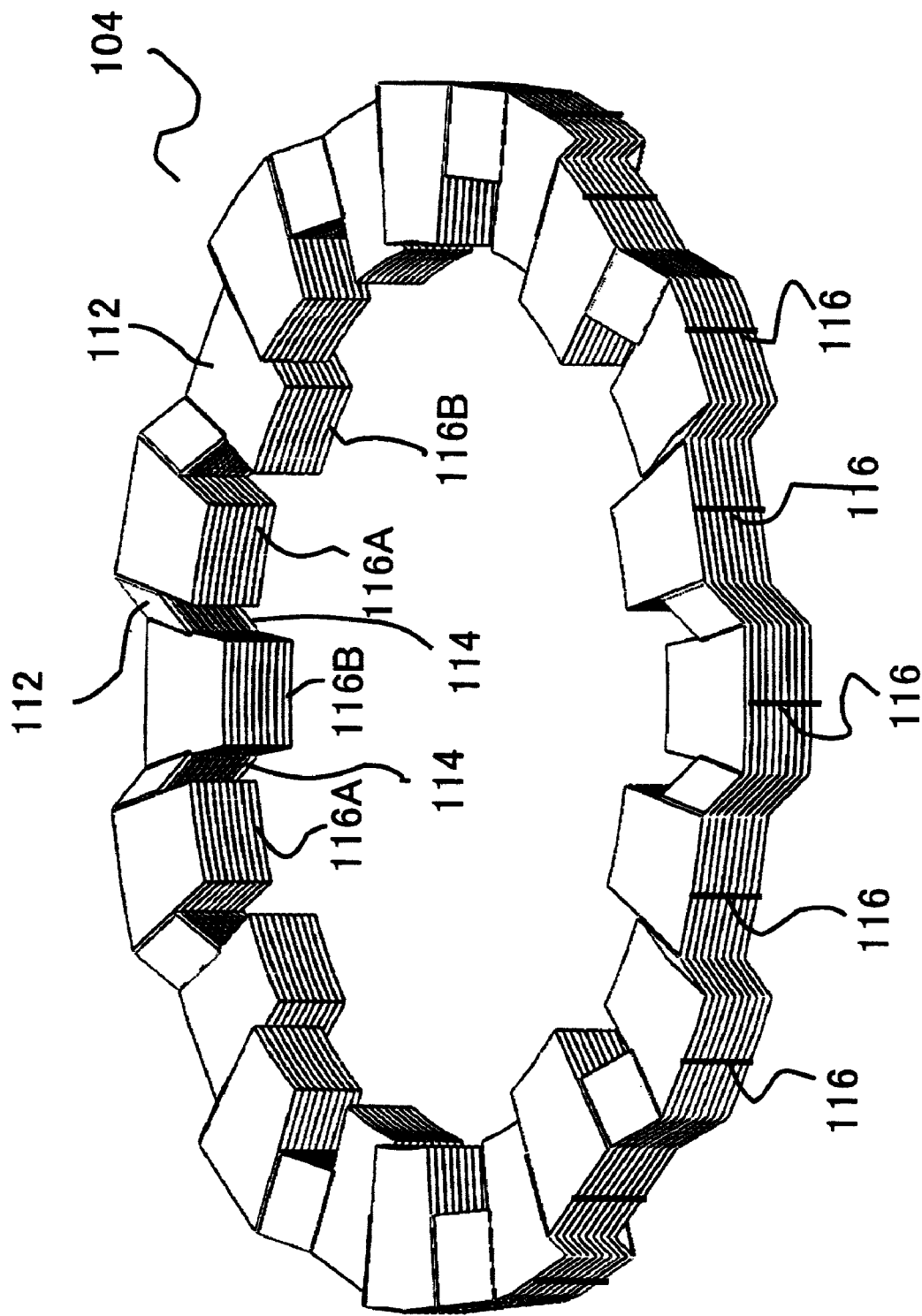
Figure 4:
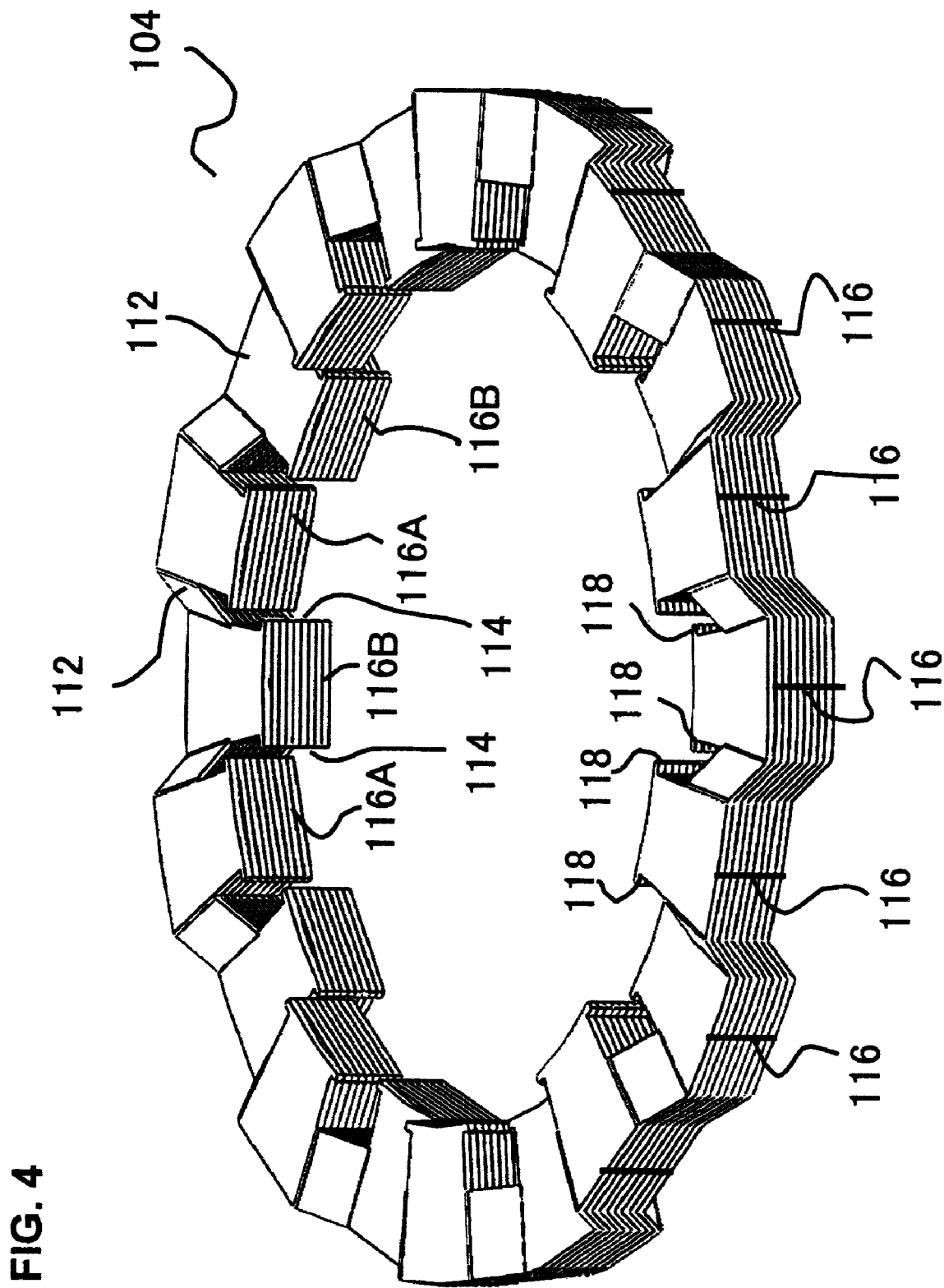
Figure 5:
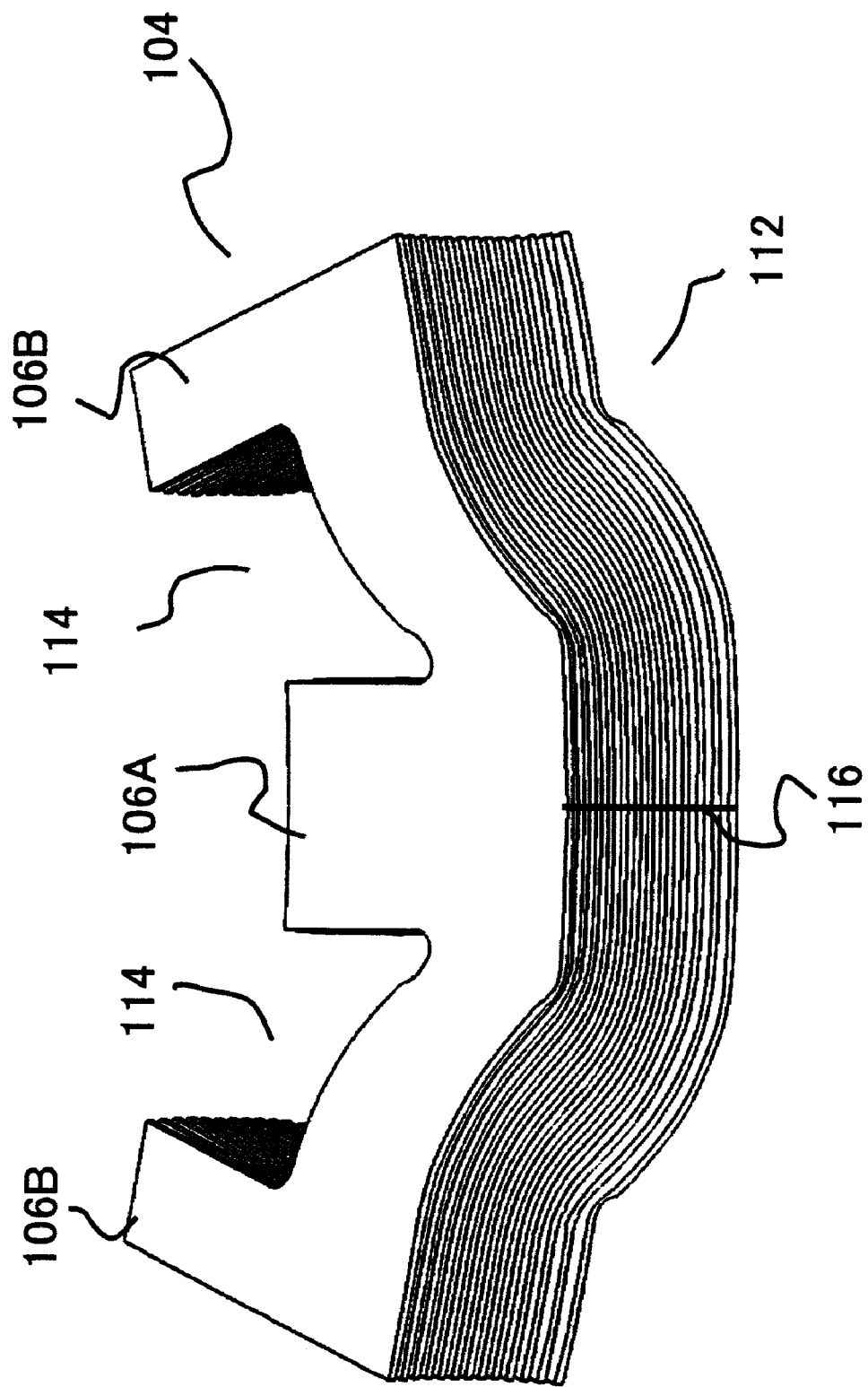
Figure 6:
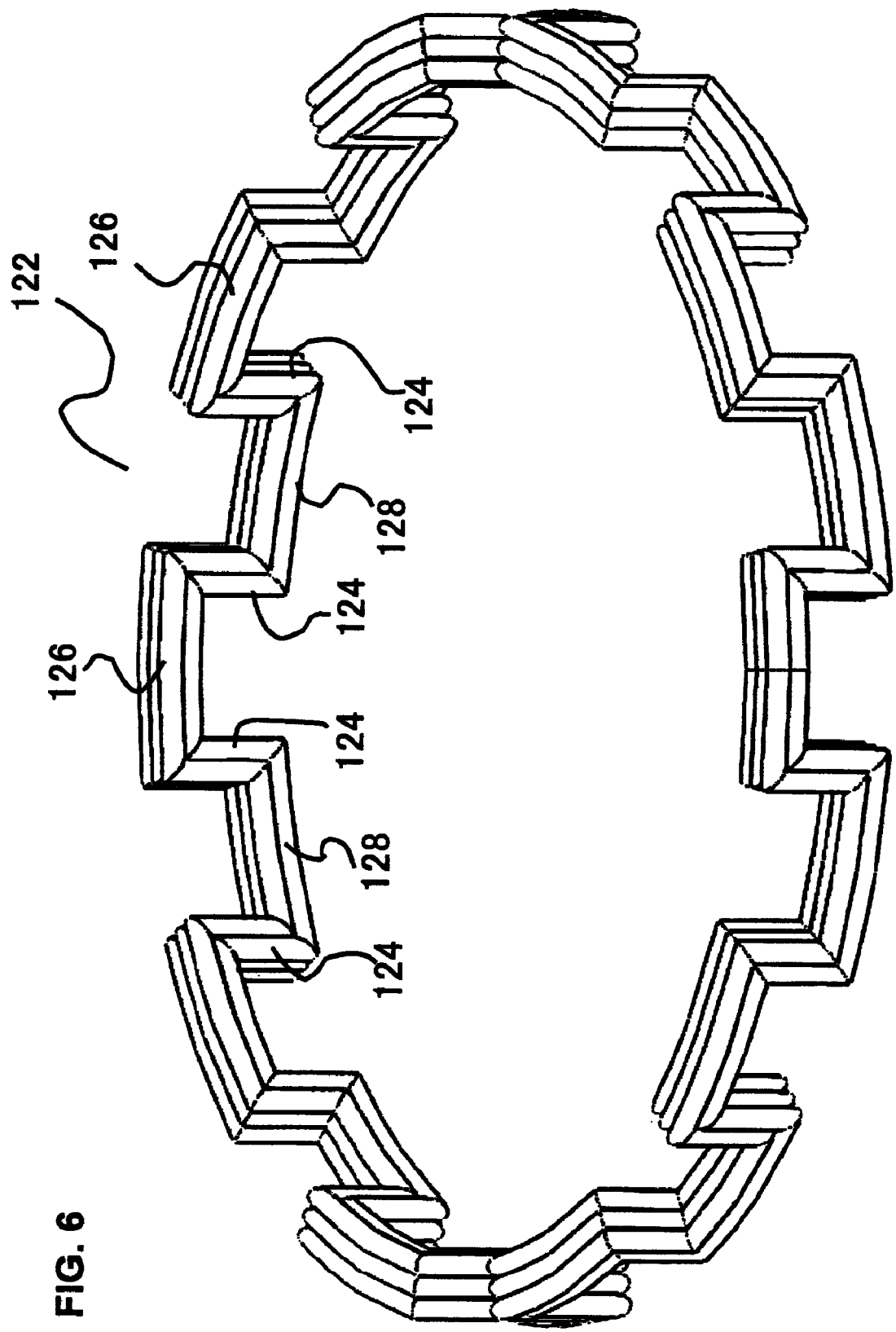
Figure 7:
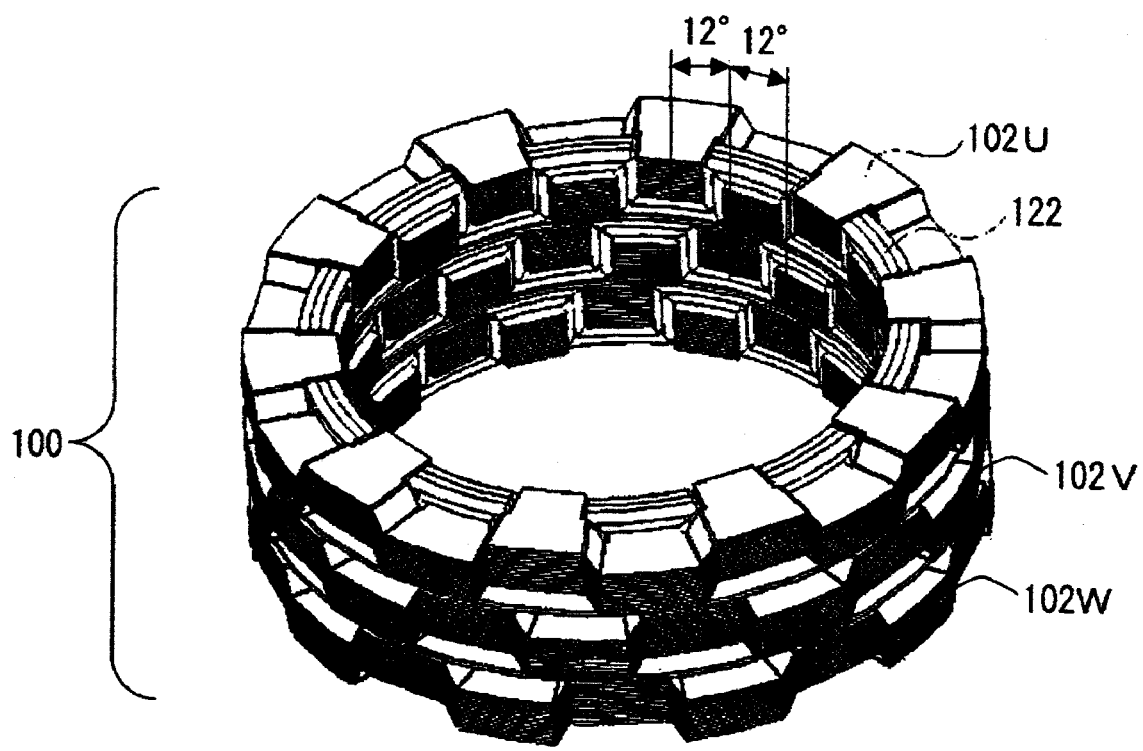
Figure 8:
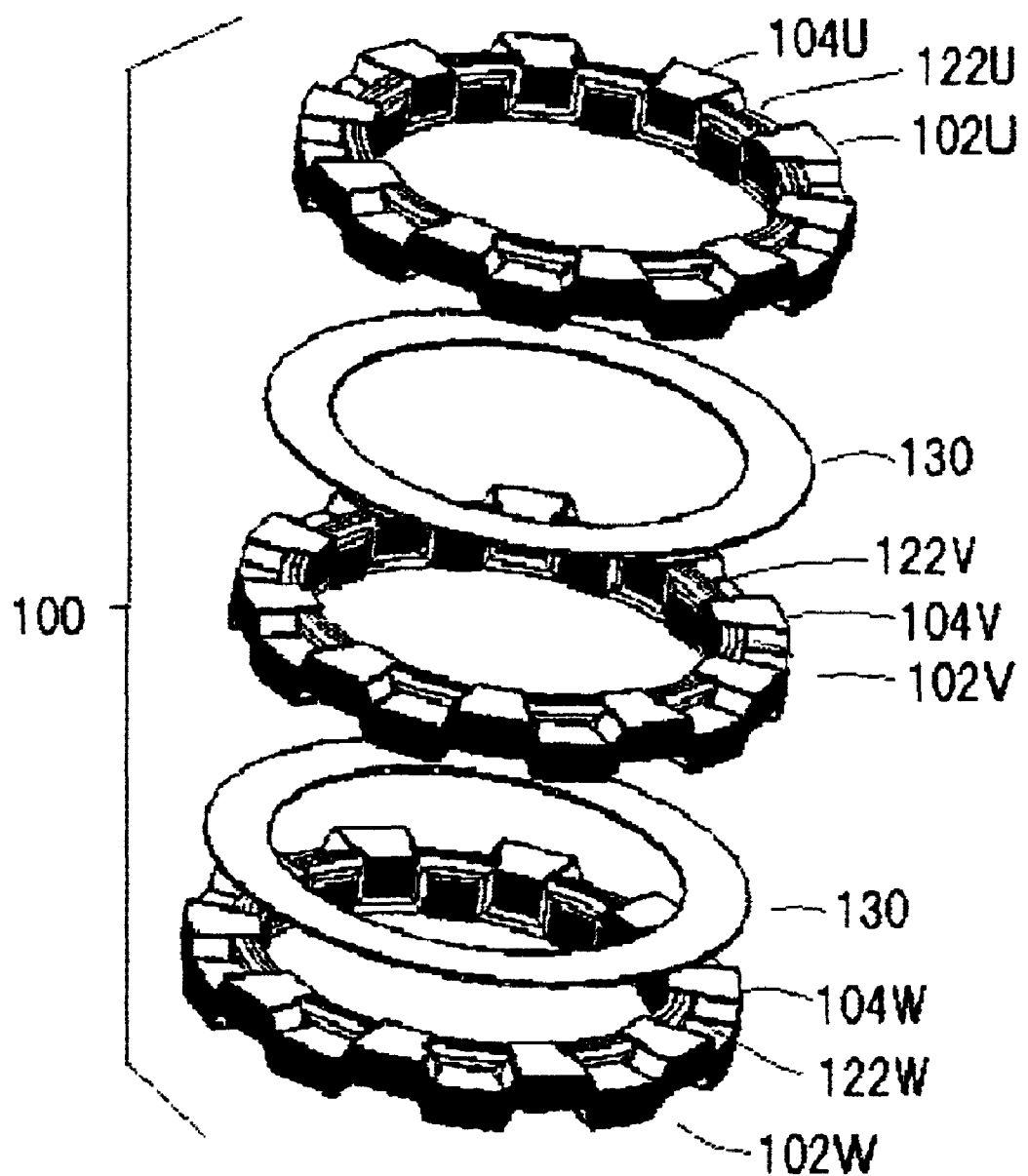
Figure 9:
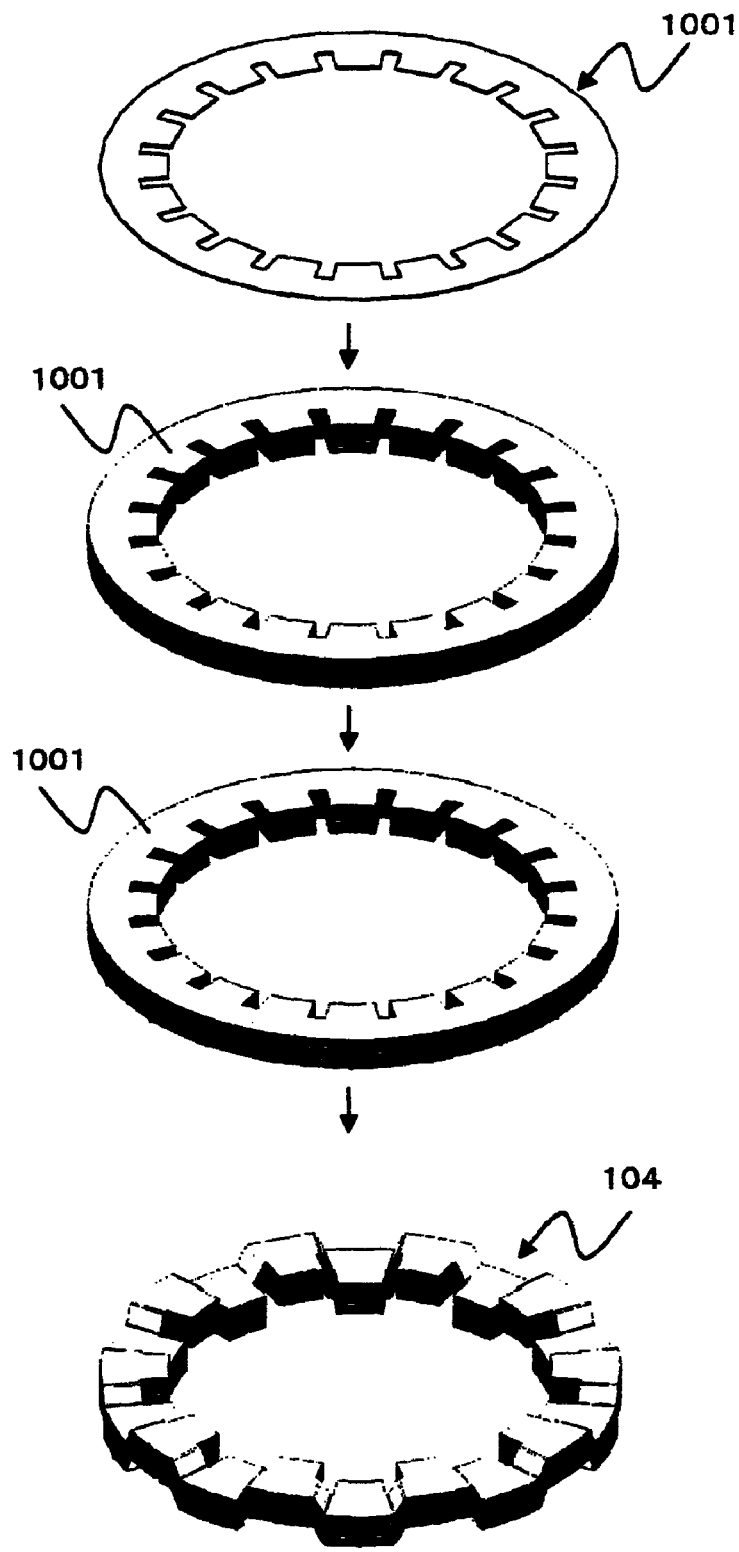
Figure 10:
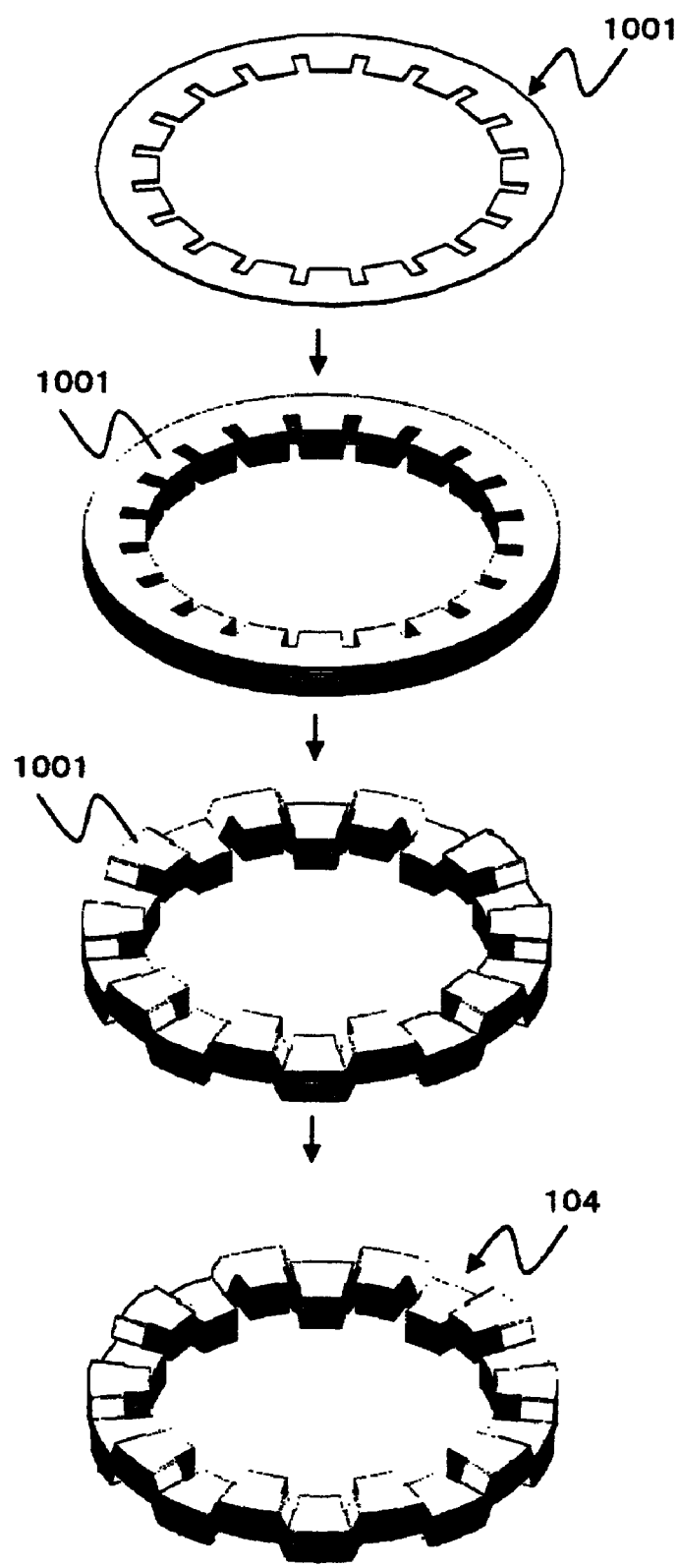
Figure 11:
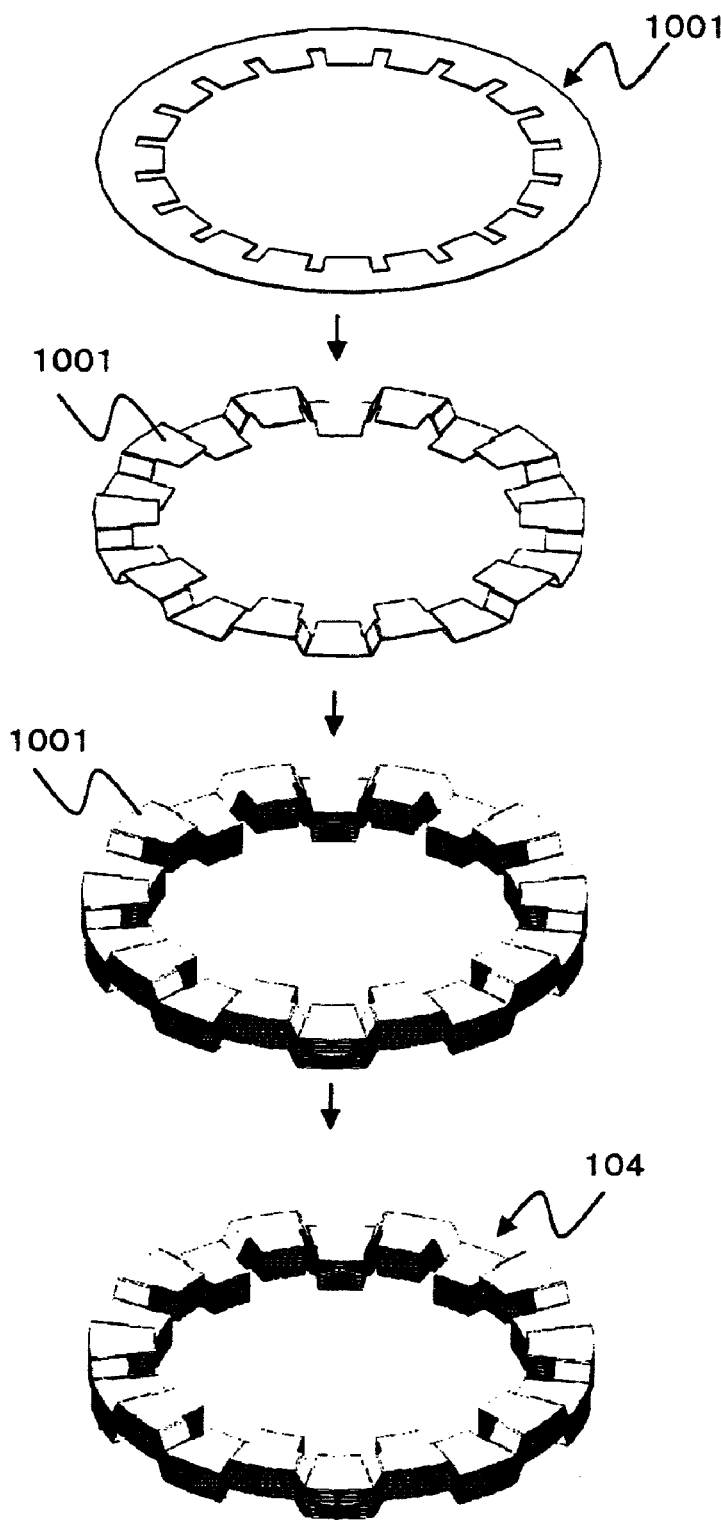
Figure 12A:
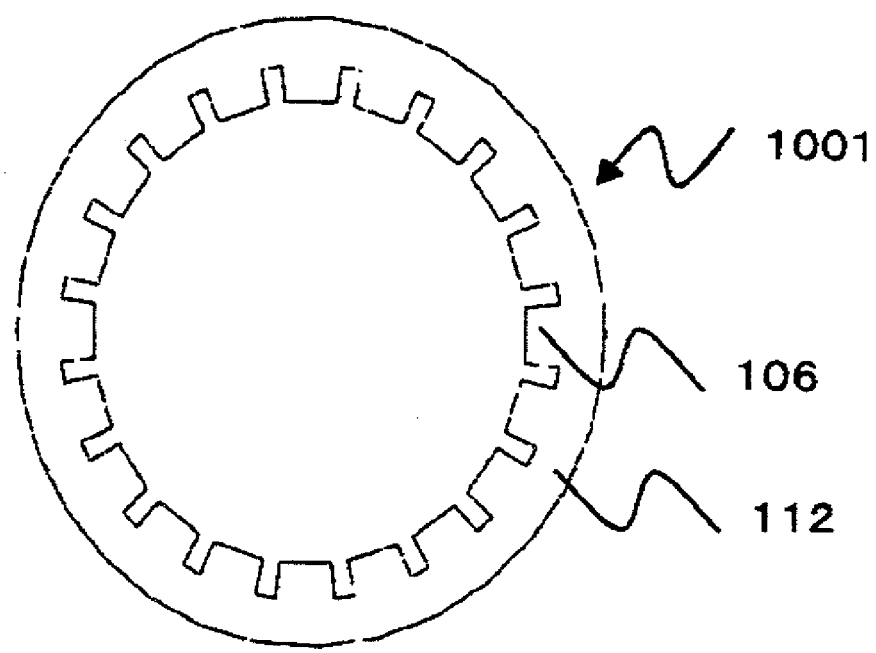
Figure 12B:
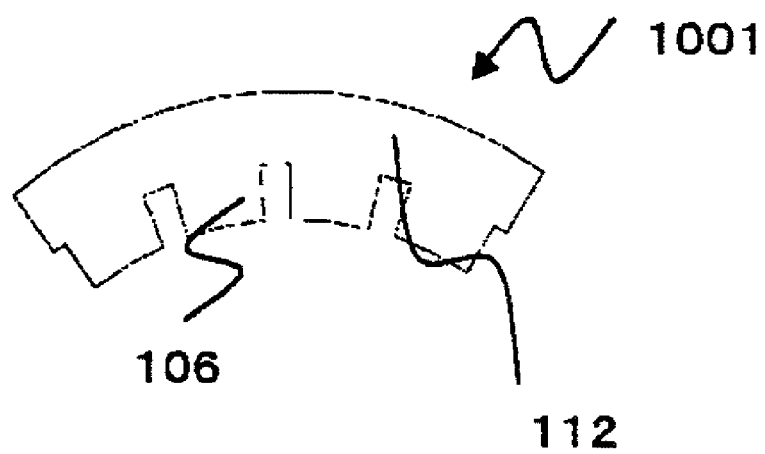
Figure 12C:
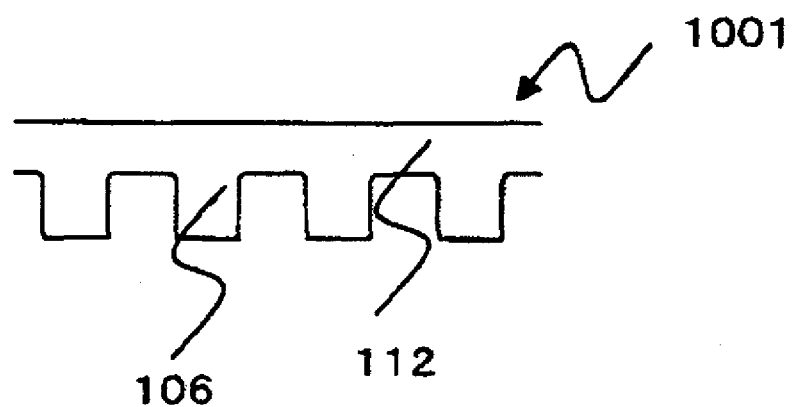
Figure 13:
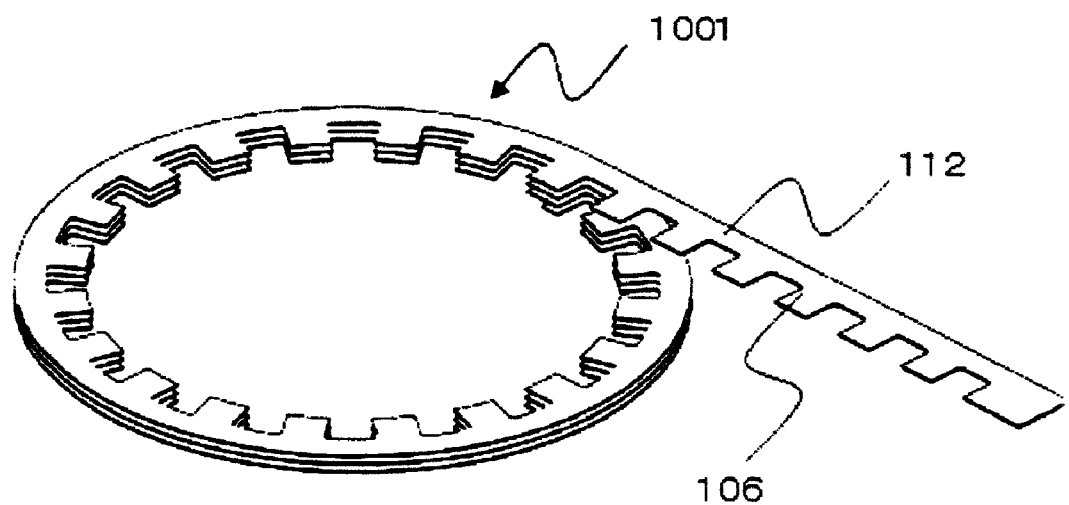
Figure 14A:
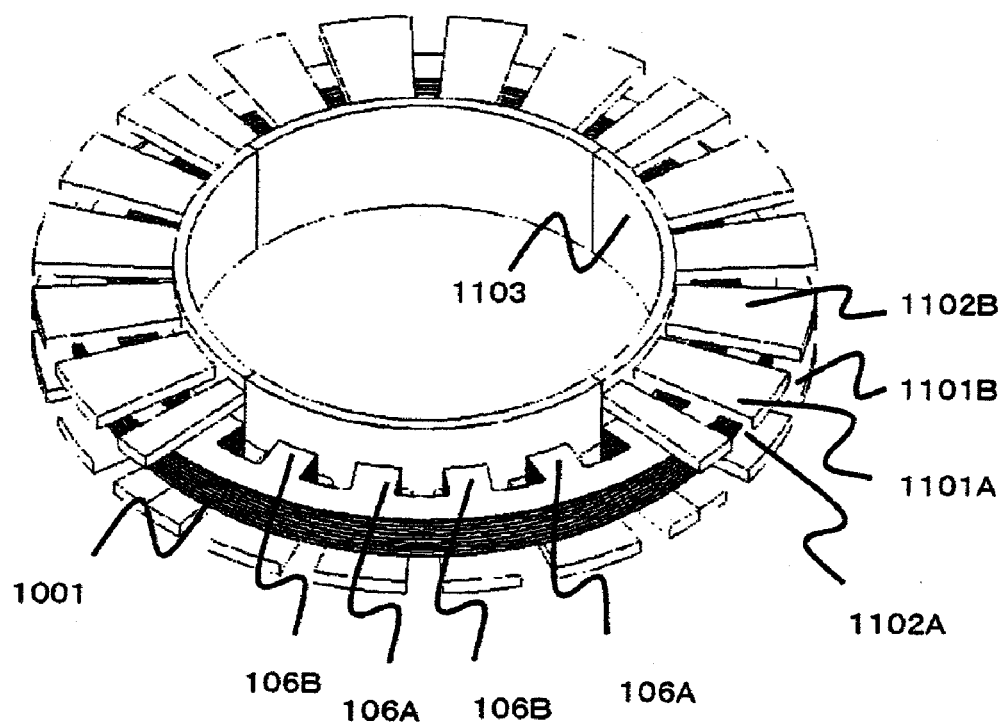
Figure 14B:
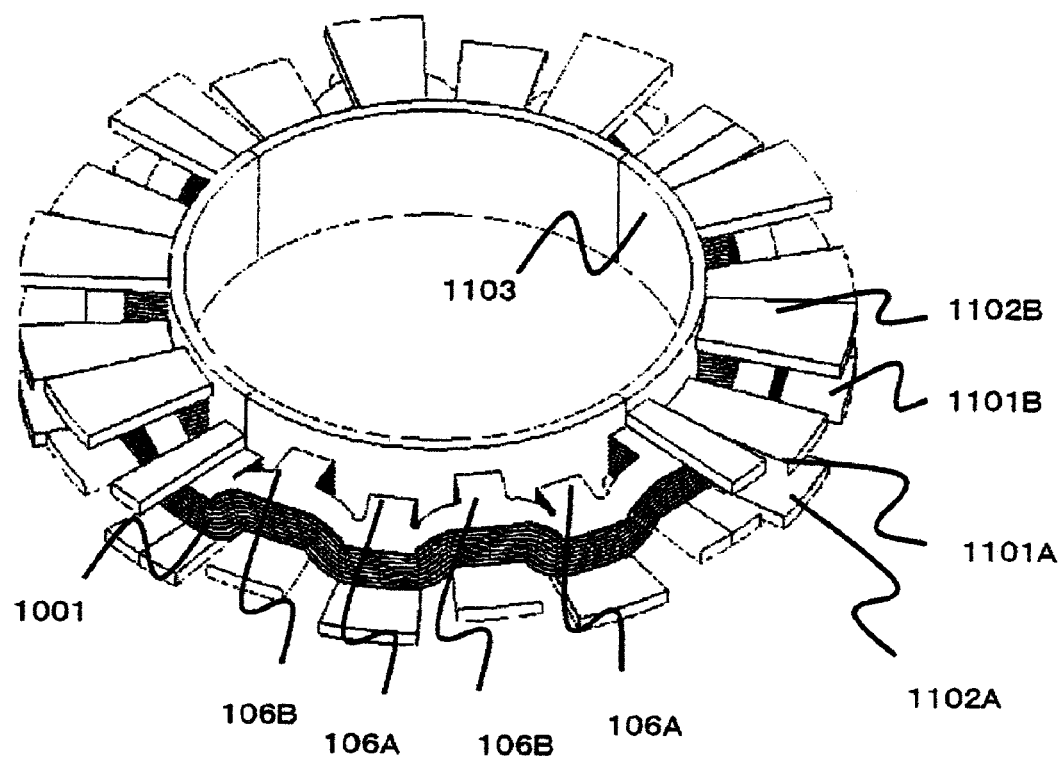
Figure 15A:
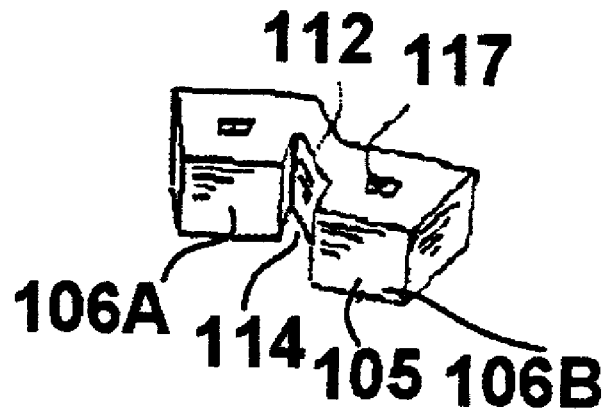
Figure 15B:
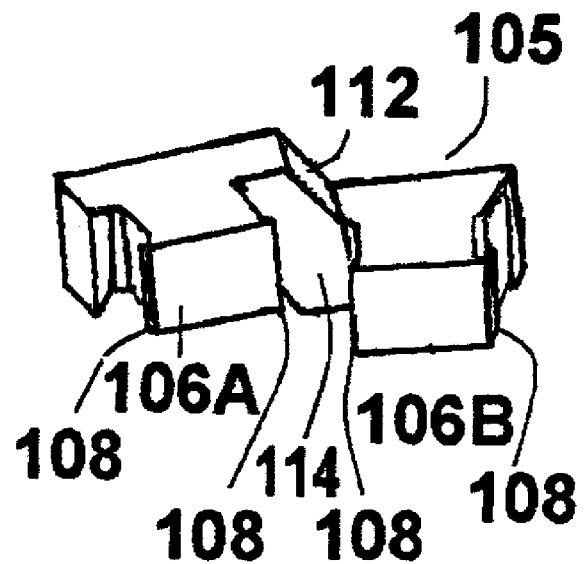
Figure 15C:
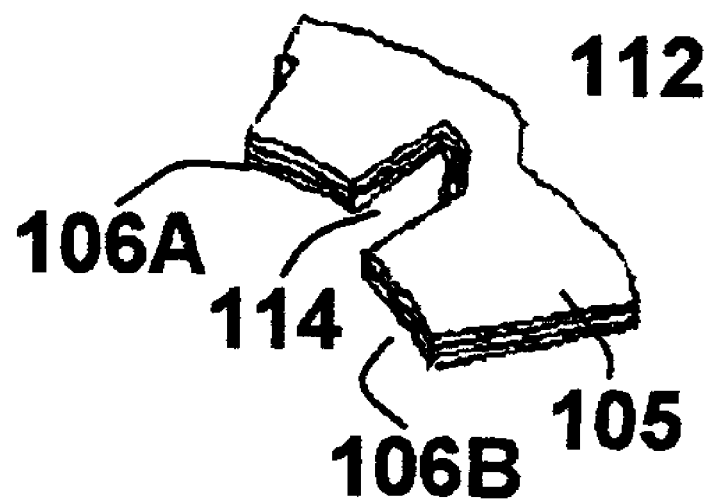
Figure 16A:
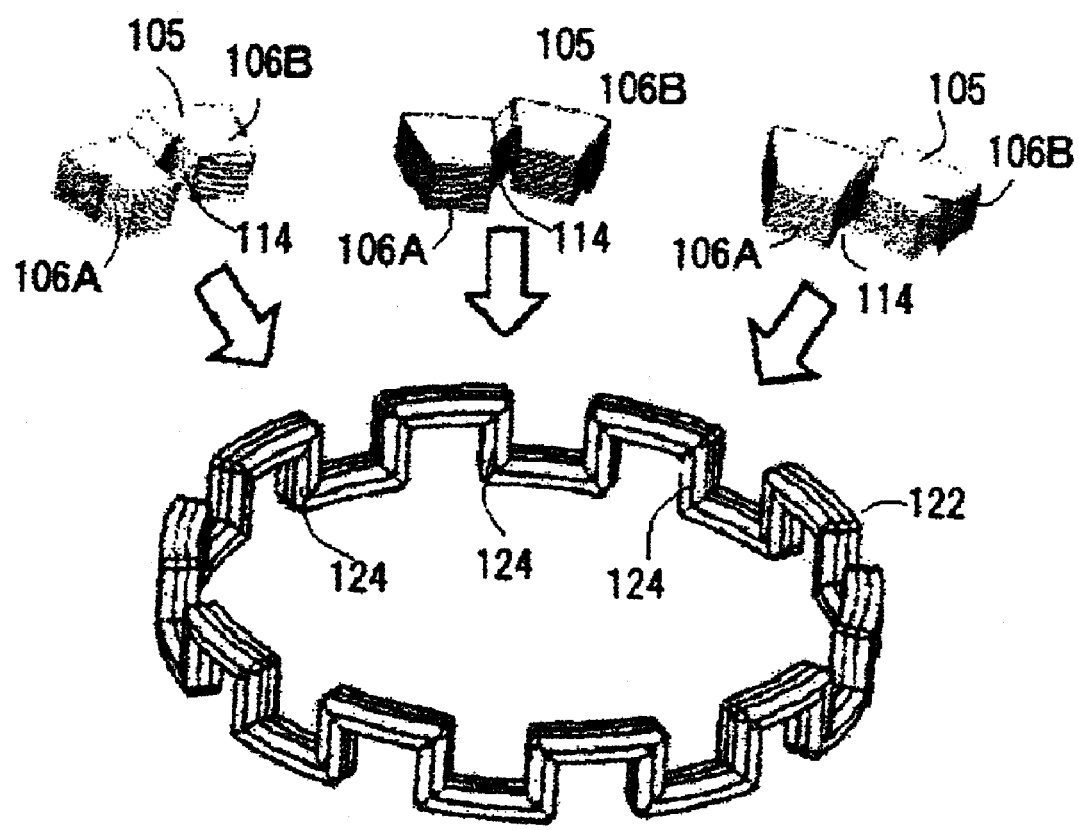
Figure 16B:
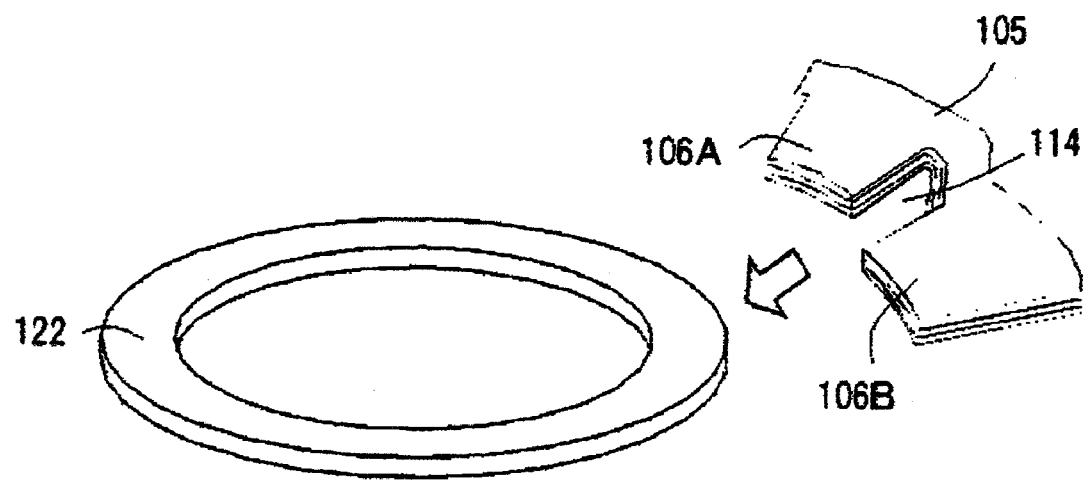
Figure 17:
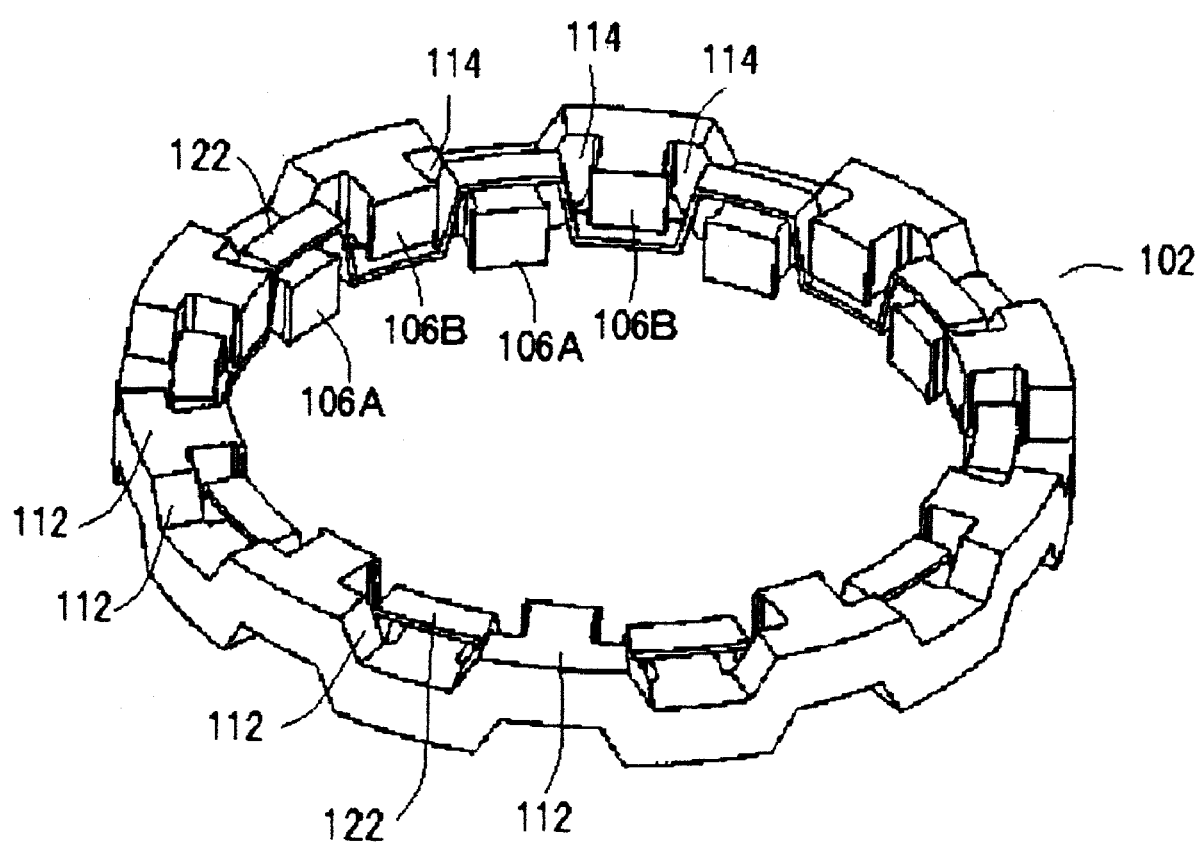
Figure 18A:
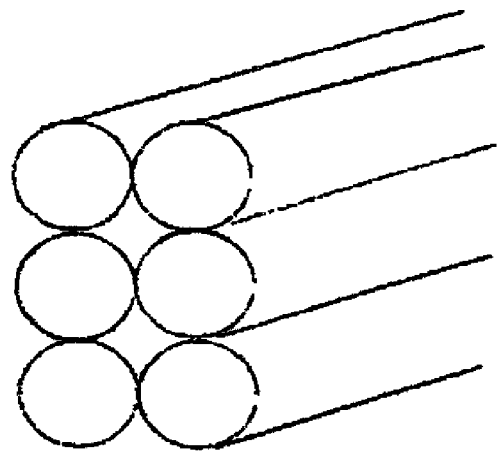
Figure 18B:
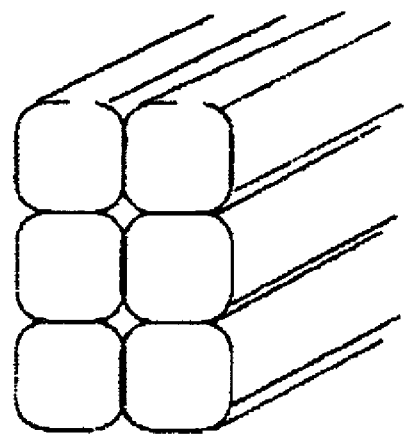
Figure 18C:
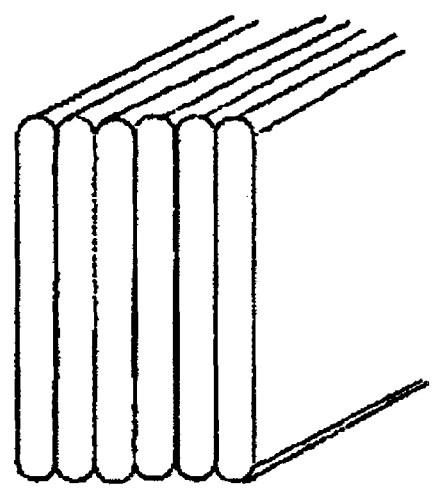
Figure 18D:
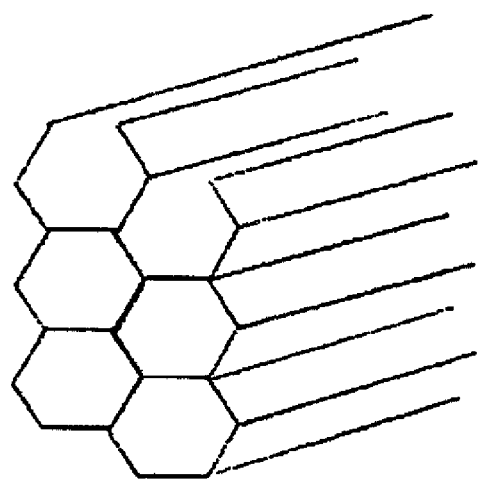
Figure 19A:
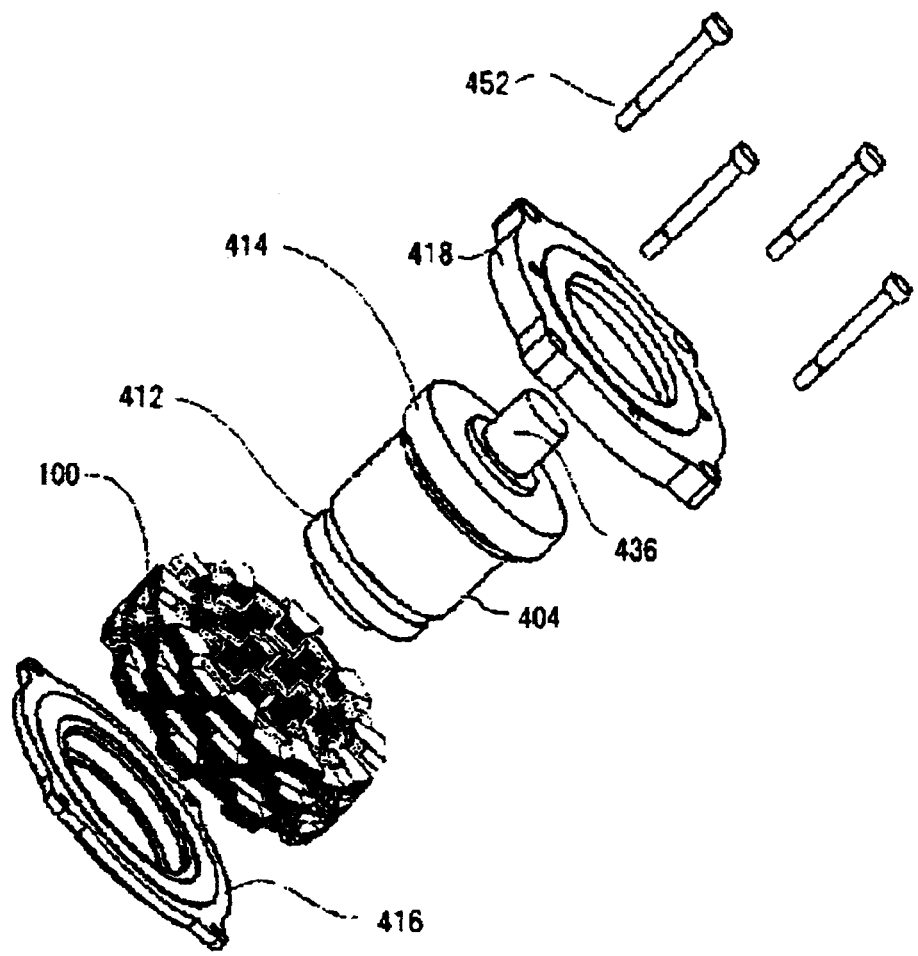
Figure 19B:
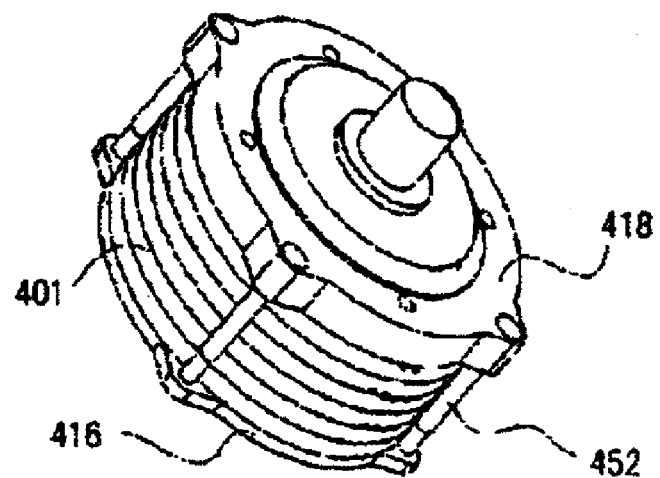

2A, which is a partial cross-sectional view perpendicular to a rotating shaft of the basic structure of the stator illustrated in FIG. 2A;

FIG. 3 is a perspective view showing a stator core of the basic structure of the stator illustrated in FIG. 1;

FIG. 4 is a perspective view showing a stator core of the basic structure of a stator according to the other example of FIG. 2;

FIG. 5 shows yet another embodiment of the stator core illustrated in FIG. 3;

FIG. 6 is a stator winding used in the basic structure of the stator shown in FIGS. 1 and 2;

FIG. 7 is a perspective view of a stator according to a preferred embodiment of the present invention;

FIG. 8 is an expansion diagram of the stator illustrated in FIG. 7;

FIG. 9 shows a first example of a manufacturing method according to one preferred embodiment of the present invention;

FIG. 10 shows a second example of a manufacturing method according to one preferred embodiment of the present invention;

FIG. 11 shows a third example of a manufacturing method according to one preferred embodiment of the present invention;

FIG. 12A is a plan view of a material shape of the stator core, wherein the material is an annularly connected member;

FIG. 12B shows a shape in which a plurality of magnetic pole sections are connected in a strip shape with a polarizability;

FIG. 12C shows a shape in which a plurality of magnetic pole sections are connected linearly in a strip shape;

FIG. 13 is a perspective view of a manufacturing step in which the material is layered spirally;

FIG. 14A is a perspective view of a step for forming a material in the shape of a wave, showing the state prior to forming the material in the shape of a wave;

FIG. 14B is a view showing the state after forming the material in the shape of a wave;

FIG. 15A shows a pair of stator core poles, illustrating the pair of stator core poles shown in FIGS. 3 through 5;

FIG. 15B shows a pair of stator core poles with a flange;

FIG. 15C shows a pair of stator core poles according to yet another example;

FIG. 16A shows another embodiment of the manufacturing method of a stator corresponding to a single phase;

FIG. 16B shows yet another embodiment of the manufacturing method of a stator corresponding to a single phase;

FIG. 17 is a perspective view showing another embodiment of the stator corresponding to a single phase;

FIG. 18A is a partial cross-sectional view of a stator winding;

FIG. 18B is a partial cross-sectional view of a stator winding;

FIG. 18C is a partial cross-sectional view of a stator winding;

FIG. 18D is a partial cross-sectional view of a stator winding;

FIG. 19A is a perspective view prior to assembling, illustrating the application of the stator core to a dynamo-electric machine; and FIG. 19B is a perspective view after assembling, illustrating the application of the stator core to a dynamo-electric machine.

DESCRIPTION OF REFERENCES 100 three-phase AC stator
102 stator
102U U-phase stator
102V V-phase stator
102W W-phase stator
104 stator core
104U U-phase stator core
104V V-phase stator core
104W W-phase stator core
106A teeth
106B teeth
108 flange
112 rear side section
114 slots
116 welding section
122 stator winding
122U U-phase stator winding
122V V-phase stator winding
122W W-phase stator winding
124 interpolar section
126 magnetic pole end section
128 magnetic pole end section
130 magnetic insulating panel
401 outer circumference
404 rotor
412 bearing
414 bearing
416 rear side housing
418 front side housing
436 shaft
452 through bolt
1001 material
1101A punch
1101B punch
1102A counter
1102B counter
1103 stopper

BEST MODE FOR CARRYING OUT THE INVENTION

Now, a preferred embodiment of the present invention will be described with reference to the drawings.

[Description of the Basic Structure of a Stator]

We will now describe the basic structure of a stator 102 according to one preferred embodiment of the present invention with reference to FIGS. 1 through 6. FIG. 1 is a perspective view showing the basic structure of the stator 102 according to one preferred embodiment of the present invention.

Figure 2B:
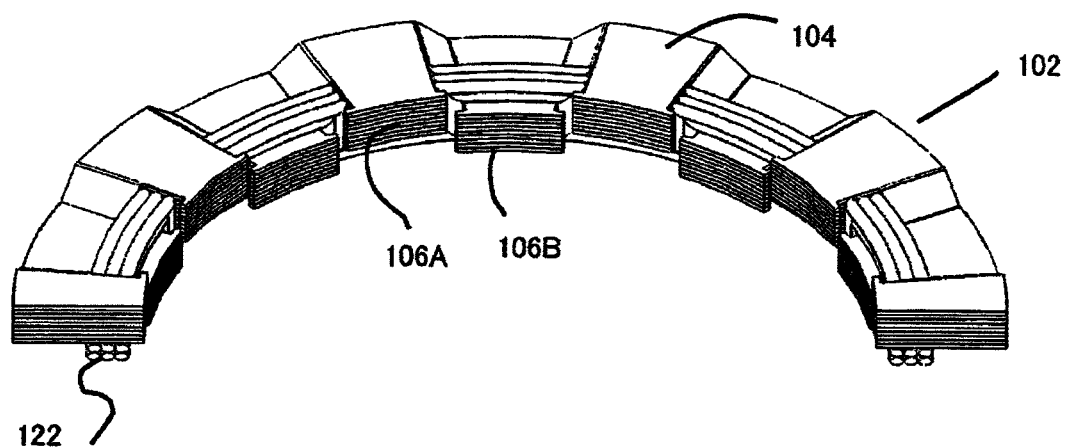
FIG. 2B is a partial cross-sectional view of the basic structure of the stator illustrated in FIG. 2A.
Figure 2C:
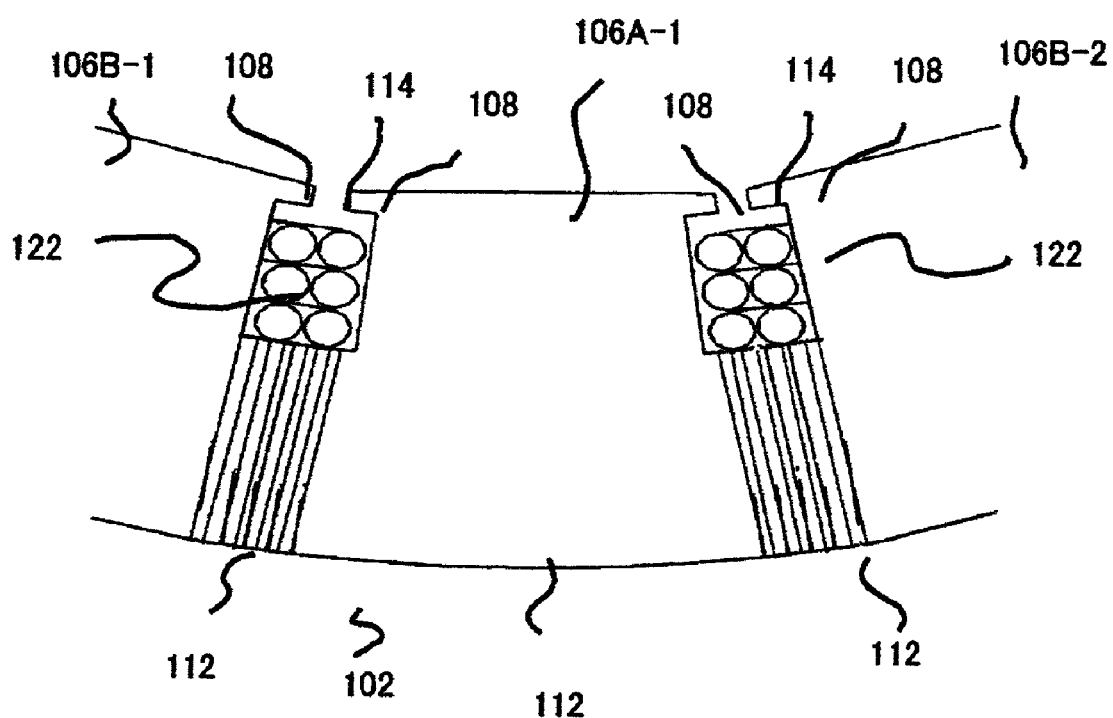
FIG. 2C is a partial cross-sectional view showing yet another view of the basic structure of the stator shown in FIG.

FIGS. 2A through 2C illustrate another preferred embodiment of the basic structure of the stator shown in FIG. 1, wherein flanges 108 are disposed on the respective magnetic pole sections 106 in the basic structure shown in the embodiment of FIG. 1. FIG. 2A is an overall view of the basic structure of the stator 102 according to another example, FIG. 2B is a partial cross-sectional view of the basic structure of the stator 102 according to FIG. 2A, and FIG. 2C is yet another partial cross-sectional view showing another view of the basic structure of the stator 102 shown in FIG. 2A, which is a partial cross-sectional view perpendicular to a rotating shaft of the basic structure of the stator 102 shown in FIG. 2A.

FIG. 3 is a perspective view showing a stator core 104 according to the basic structure of the stator 102 shown in FIG. 1, and FIG. 4 is a perspective view showing a stator core 104 according to the basic structure of the stator 102 of the other example shown in FIG. 2. Further, FIG. 5 shows yet another embodiment of the stator core 104 illustrated in FIG. 3. FIG. 6 shows a stator winding 122 used in the basic structure of the stator 102 illustrated in FIGS. 1 and 2.

The basic structure of the stator 102 as shown in FIG. 1 or FIGS. 2A through 2C is composed of a stator core 104 and a stator winding 122. On the rotor-side of the basic structure of the stator 102, magnetic pole sections 106 acting as the magnetic poles of the stator 102 are disposed at even intervals across the whole circumference of the stator, wherein the magnetic pole sections are alternately denoted by reference numbers 106A and 106B merely for the convenience of describing the operation thereof hereafter, and the magnetic pole sections 106A and 106B actually operate in the same manner. A rotor mentioned earlier is disposed rotatably on the inner side of the magnetic pole sections 106A and 106B, but for sake of easier description, the rotor is not shown in FIGS. 1 through 4.

In a dynamo-electric machine, the stator 102 can be disposed on either the outer side of the rotor or the inner side of the rotor, and either structure can be adopted in the present embodiment, but for sake of easier description, the present embodiment is described with the stator disposed on the outer side of the rotor. If the present invention is used as an AC power generator, a Rundle-type rotor is adopted as the rotor. It is also possible to adopt a permanent magnet rotor having a permanent magnet disposed on the surface or in the interior thereof, a flux barrier rotor for generating a reluctance torque by restricting the magnetic flux of axis D or axis Q, or a squirrel-cage rotor, wherein the above-mentioned rotor and the stator 102 can be combined to form a dynamo-electric machine, and the dynamo-electric machine can operate as a motor or a generator in the respective applications.

The basic structure of the stator 102 illustrated in FIG. 1 and the basic structure of the stator 102 illustrated in FIGS. 2A through 2C are very similar, but according to the basic structure illustrated in FIGS. 2A through 2C, flanges 108 are provided on the magnetic pole sections 106 on the side of the rotor toward the directions of the adjacent magnetic poles, by which the area of the side surface of the rotor in the basic structure of the stator 102 is increased and the output characteristics thereof is improved. Further, the stator core 104 illustrated in FIG. 5 shows yet another embodiment of the stator core 104 illustrated in FIGS. 3 and 4, wherein rear side sections 112 connecting the adjacent magnetic pole sections 106 are curved so as to improve the productivity.

As shown in FIGS. 2A and 2B, magnetic pole sections 106 are disposed at equal intervals on the circumferential surface perpendicular to the rotating shaft, and since the magnetic pole sections 106 are alternately displaced in the direction of the rotating shaft, recesses are formed at positions corresponding to every other magnetic pole section 106 at the end in the rotating shaft direction in the basic structure of the stator 102. A stator winding 122 is disposed in the recesses, so that the projection of the stator winding 122 from the stator core 104 at the end of the rotating shaft can be reduced or eliminated.

FIG. 2C shows a cross-sectional view in which the magnetic pole sections 106A and magnetic pole sections 106B illustrated in FIG. 2B are partially cut away at a plane perpendicular to the rotating shaft. As shown in FIG. 2C, slots 114 extending in the rotating shaft direction are formed between the respective magnetic pole sections 106A and magnetic pole sections 106B, and in the slots 114 are stored the stator winding 122. The difference between the present stator and the prior art stator is that a single-phase winding is inserted to the slots 114, and that the structure of the stator winding 122 is simple. Thus, the present stator has superior productivity and improved reliability. As shown in FIG. 2C, the respective magnetic pole sections 106 are connected via the rear side section 112. Further, flanges 108 are formed on the rotor side of the respective magnetic pole sections 106, and the rotor side of the respective slots 114 are narrowed by the flanges 108. According to this structure, the area of the surface opposing to the rotor is increased, and the characteristics of the dynamo-electric machine are improved.

The stator core 104 shown in FIGS. 3 through 5 is the stator core 104 of the basic structure of the stator 102 as shown in FIGS. 1 and 2, wherein a plurality of magnetic pole sections 106 are disposed on the rotor side at even intervals across the whole circumference thereof. In the present embodiment, 20 magnetic pole sections 106 are disposed. These magnetic pole sections 106 are respectively connected with adjacent magnetic pole sections 106 at the rear side section 112, and spaces 114 or slots 114 extending in the direction of the rotating shaft are formed between the adjacent magnetic pole sections 106 for inserting the stator winding.

In the stator core 104 illustrated in FIGS. 1 through 5, magnetic pole sections 106 are alternately displaced in the rotating shaft direction, wherein the magnetic pole sections 106A are displaced toward the other side with respect to the magnetic pole section 106B. According to this structure, spaces are formed on one side of the magnetic pole sections 106 to enable the stator winding 122 to be arranged therein, so that the stator windings 122 can be prevented from projecting to one side, and the basic structure of the stator 102 can be downsized. Copper loss can be minimized. Similarly, since the magnetic pole sections 106B are displaced toward one side with respect to the magnetic pole sections 106A, a space is formed on the other side of the magnetic pole sections 106. By arranging the stator winding 122 in this space, the stator winding 122 can be prevented from projecting to the other side, and the basic structure of the stator 102 can be downsized as mentioned earlier. Further, copper loss can be minimized.

However, the alternately displaced arrangement of the magnetic pole sections 106 as described above is not indispensible, and the present stator without the displaced arrangement is still extremely superior to the stator of the prior art dynamo-electric machine from the viewpoint of productivity, since the basic structure of the stator 102 of the dynamo-electric machine enables the winding operation of the stator winding 122 to be performed extremely easily. Further, the present embodiment effectively reduces the inductance of the stator significantly compared to the common claw-pole type stator as disclosed in patent document 1 or patent document 2 in which a large number of claws are disposed on the side of the rotor.

The stator core 104 illustrated in FIGS. 3 through 5 have weld sections 116 in which the outer circumferential surface of the rear side section 112 on the side opposite from the magnetic pole section 106 are fixed via welding. The stator core 104 is formed by winding continuous magnetic steel sheets of a thin plate shape in the circumferential direction, as described in detail later, so as to improve the productivity and cut down material waste. Since the welding sections 116 are formed on the outer circumferential surface of the rear side section 112 corresponding to the respective magnetic pole sections 106, the magnetic pole sections 106 can be easily displaced in the rotating shaft direction by winding the continuous thin-plate magnetic steel sheet in the circumferential direction and forming the stator and thereafter the rear side section 112 via pressing or the like at the weld sections 116.

FIG. 6 illustrates the stator winding 122 used in the basic structure of the stator 102, and in the present embodiment, the stator winding 122 is wound in a wave shape. Concentrated windings other than wave winding can be used, but the present embodiment is illustrated taking as an example a wave-shaped stator winding 122. The wave-shaped stator winding 122 shown in FIG. 6 has a continuous shape in which interpolar sections 124 of the stator winding is connected to magnetic pole end sections 126 on one side of the stator winding 122 and magnetic pole end sections 128 on the other side of the stator winding. The interpolar sections 124 of the stator winding 122 are mutually connected to the magnetic pole end sections 126 on one side of the stator winding 122 or to the magnetic pole end sections 128 on the other side of the stator winding 122, and the magnetic pole end sections 126 on one side of the stator winding 122 are respectively inserted to slots 114 having a shape extending in the rotating shaft direction of the stator core 104 as illustrated in FIGS. 2 through 5.

Recesses are mutually formed at axial direction ends of the stator core 104 corresponding to the magnetic pole sections 106, and the magnetic pole end sections 126 on one side of the stator winding 122 is inserted to the recesses formed on one end of the stator core 104, and the magnetic pole end sections 128 on the other side of the stator winding 122 are inserted to the recesses formed on the other end of the stator core 104. As mentioned earlier, it is not always necessary to form recesses on both ends of the rotating shaft of the stator core 104, and in that case, the magnetic pole ends 126 on one side of the stator winding 122 and the magnetic pole ends 128 on the other side of the stator winding 122 are projected toward the direction of the rotating shaft from both ends of the stator core 104.

When the winding illustrated in FIG. 6 is attached to the stator core 104 as shown in FIGS. 3 through 5, the winding will be disposed alternately within the grooves 114 formed in the axial direction of the stator core 104, according to which all the slots are covered by the winding in a similar winding form as a wave winding structure of a slot-teeth type motor. Therefore, the present embodiment has superior electric characteristics with respect to a claw-pole type stator having claws disposed between the stator 102 and the rotor.

[Description of a Stator for a Three-Phase AC Dynamo-Electric Machine]

The basic structure of the stator 102 as described earlier operates as a single-phase stator with respect to the whole stator. Hereafter, a three-phase AC stator 100 will be described with reference to FIGS. 7 and 8. FIG. 7 is a perspective view of a stator 100 of a three-phase dynamo-electric machine formed by assembling basic structures of stators 102 as shown in FIG. 1 or FIG. 2. FIG. 8 is an expansion diagram of the three-phase AC stator 100 illustrated in FIG. 7.

The three-phase AC stator 100 illustrated in FIG. 7 utilizes the basic structure of three stators 102, respectively, as a U-phase stator 102U, a V-phase stator 102V and a W-phase stator 102W. The U-phase stator 102U, the V-phase stator 102V and the W-phase stator 102W are aligned respectively in the rotating shaft direction, wherein the rotor is used in common, and the basic structures of the stators 102 of respective phases are arranged so that they have mutual phases.

[Description of Phases]

When a stator 100 of a multi-phase dynamo-electric machine is formed by using the basic structure of the stator 102 as described earlier, the stators of respective phases are arranged independently in the axial direction. As for the relative positional relationship of stators of respective phases, if the machine is a two-phase dynamo-electric machine, the basic structures 102 of the stators are arranged with a 90-degree phase difference of electric angles. In other words, the stators are disposed so that the mechanical angles of one pair of poles on the rotor side are displaced by ¼.

In the case of a stator 100 for a three-phase dynamo-electric machine, the stators are arranged with a 120-degree phase difference in electric angles. In other words, the stators are disposed so that the mechanical angles per pair of poles on the rotor side are displaced by ⅓. FIG. 7 illustrates an example of a stator 100 of a three-phase dynamo electric machine. FIG. 7 illustrates a stator of a three-phase dynamo-electric machine having 20 poles. Since there are 20 poles, the number of pole pairs is 10. Therefore, the mechanical angle of displacement of poles between one phase and another phase is ⅓ of 36 degrees which is the mechanical angle of 10 pole pairs, in other words, 12 degrees.

The above description illustrates a structure in which the rotor is shared with respect to the basic structures of respective stators 102 constituting the three-phase AC stator 100, and wherein the rotor has no phase. By using the rotor as a common structure, the structure of the whole body of the dynamo-electric machine can be simplified, which is significantly effective from the viewpoint of downsizing and improving productivity of the stator. Especially when the above-mentioned dynamo-electric machine is used as an AC power generator, the basic structure of the respective stators 102 constituting the three-phase AC stator 100 can share the common disclosed winding, according to which a high power output can be obtained.

However, it is also possible not to provide any phase to the mounting position of phases on the stator side, but instead, to divide the rotor side corresponding to the respective phases and arrange the poles on the rotor side corresponding to the respective stators to have phases for constituting the multi-phase dynamo-electric machine as described above: This relationship of phases is the same as the relationship described with reference to the stator.

Two-phase AC and three-phase AC as typical examples of the stator 100 of a multi-phase dynamo-electric machine have been described up to now, but the present embodiment enables the stator to correspond to AC having greater phases. For example, in order to form a stator 100 of a six-phase AC generator, six basic structures of the stator 102 can be arranged in the axial direction, and a phase of 60 degrees in electric angle should be provided thereto. By dividing the six-phase AC generator per three phases and parallely-connecting the same after rectification, the maximum current per phase can be reduced and the current capacity of a rectifier circuit or the like can be minimized.

[Description of Structure of a Three-Phase Stator]

FIG. 7 shows a stator 100 for a three-phase AC dynamo-electric machine as a typical example of a stator 100 for a multi-phase dynamo-electric machine. The actual structure of a three-phase AC stator 100 will be described with reference to FIG. 8. The basic structures of the stator 102 described in FIGS. 1 and 2 are arranged as three stator blocks, which are a U-phase stator 102U, a V-phase stator 102V and a W-phase stator 102W, aligned in the axial direction. In the present arrangement, magnetic insulation members having a magnetic shielding effect for reducing flux leakage between phases are disposed between the phases. The magnetic insulation members are not indispensible, and can be arranged if necessary, but the reduction of flux leakage leads to improvement of efficiency and enhancement of characteristics.

The insulation material should preferably be composed of a nonmagnetic material such as a polymeric material, or ceramic and other material having no conductivity. Furthermore, improvement of radiation performance can be expected by adopting a material having good thermal conductivity. Further, although not shown in the drawings, it is possible to realize highly accurate positioning of the stator blocks by providing slots, holes, projections, socket joints or other fitting functions on the magnetic insulation member 3 for determining the position of the stator core. This positioning is important since the circumferential positions or the coaxialness of the stators influence the torque ripple of the dynamo-electric machine.

It is also possible to form a magnetic shield using metallic materials. Actual preferable examples of metallic materials include aluminum alloys, nonmagnetic stainless steel alloys and copper alloys. If we disregard the problem of cost, lightweight titanium can be used. Examples of resin materials include LCP (liquid crystal polymer), PPS (polyphenylene sylfide resin), PBT (polybutylene terephthalate resin), PET (polyethylene-based resin), glass fiber-reinforced nylon and PC (polycarbonate resin). Further, carbon fiber-reinforced resin or epoxy-based and unsaturated polyester-based thermosetting resin can be used. The material should be determined based for example on restrictions of thermal and mechanical strength required for the motor or generator to which the stator is applied.

As for the manufacturing method of these materials, aluminum and copper alloys can be formed via die casting, and stainless steel and other alloys can be formed via machining, cold forging and warm forging. Resin-based material can be formed via processes such as injection molding. When metal-based materials are used, the shape should be determined with care regarding the developmental pathway of eddy current.

[Manufacturing Method of Stator Core 104]

The manufacturing method of a stator core will now be described with reference to FIGS. 9 through 11. The manufacturing method of the stator core 104 is composed of a step for cutting out a material 1001 from a steel sheet, a step of laminating the materials 1001, a step of joining the materials 1001, and a step of forming the materials 1001 in the shape of a wave. The stator core 104 can be formed via steps as shown in FIG. 9 in the named order; cutting out the steel sheet, laminating the cut out materials 1001, joining the cut and laminated materials 1001, and forming the cut, laminated and joined materials 100 in the shape of a wave; or via steps as shown in FIG. 10 in the named order; cutting out the steel sheet, laminating the cut out materials 1001, forming the laminated materials 1001 in the shape of a wave, and joining the materials 1001 formed in the shape of a wave; or via steps as shown in FIG. 11 in the named order; cutting out the steel sheet, forming the materials 1001 in the shape of a wave, laminating the materials 1001 formed in the shape of a wave, and joining the laminated materials 1001.

In the step of cutting material out of a steel sheet illustrated in FIGS. 9 through 11, the material sheet is cut into shapes having expanded the magnetic pole sections 106 and the rear side sections 112. Methods for cutting the material include, for example, shearing such as punching using a press machine, wire cutting, laser cutting, plasma cutting, water jet cutting and machining, but it is preferable to adopt punching using a press machine considering productivity.

FIGS. 12A through 12C illustrate shapes of the cut out material 1001. The shape is either continuously connected in an annular shape as shown in FIG. 12A, or one or more magnetic poles of the magnetic pole section 106 and the rear side section 112 are connected in a strip shape as shown in FIGS. 12B and 12C. According to the material 1001 connected annularly, the accuracy of the inner and outer diameters of the material 1001 is good, but the yield is not good since the material at the center section is not used. On the other hand, according to the material shape in which one magnetic pole or a plurality of magnetic poles of the magnetic pole sections 106 and the rear side section 112 are connected in a strip shape, the yield is good, but the accuracy of the diameters must be ensured in the following lamination process.

In the step of laminating the materials 1001 illustrated in FIGS. 9 through 11, the materials are laminated so that the magnetic pole sections 106 are aligned in the axial direction of the rotor. The magnetic pole sections 106 can be aligned in the axial direction of the rotor, for example, by using recessed shapes formed on the rear side section 112 of the materials 1001 as a guide when laminating the materials. Further, the material shape at this time can be annular, or can have one or more magnetic poles of the magnetic pole sections connected in a strip shape. According to the material shape where multiple magnetic poles of the magnetic pole sections 106 and the rear side section 112 are connected in a strip shape, the material is laminated spirally as shown in FIG. 13. At this time, the linear shaped material 1001 is formed into a circular arc shape by performing in-plane bending in the circumferential direction. For example, the material 1001 is subjected to in-plane bending in the circumferential direction by rolling the rear side section 112 of the material 1001.

In the step of joining the materials illustrated in FIGS. 9 through 11, joining is performed after aligning the magnetic pole sections 106 and laminating the same. Joining is performed for example via clinching in which a projected section and a recessed section formed via half blanking are joined together, or via laser welding, TIG welding, bonding and so on. According to the "clinching" process in which the projected section and the recessed section formed via half blanking are joined together, projected sections and recessed sections are formed via half blanking on the material 1001 when cutting out the same, and then the material is pressed via a press machine or the like in the rotating shaft direction after lamination to join the same. In the case of laser welding or TIG welding, it is preferable to perform joining at the rear side section 112 which has little influence on the magnetic property. Further, when joining is performed using material having a magnetic insulation property, the magnetic property is improved, but if the member is used in a dynamo-electric machine, the member must be used within a temperature range in which the adhesive will not fall off.

In the step for forming the material into a wave shape as shown in FIGS. 9 through 11, magnetic pole sections 106A and 106B are alternately formed into a wave shape. The wave shape is formed by pushing in the axial end face of the magnetic pole section 106A toward the direction of the rotating shaft relatively with respect to the axial end face of the magnetic pole section 106B. In the step for forming the material into a wave shape, the magnetic pole sections 106A and 106B are moved in the radial direction of the rotating shaft, according to which the material 1001 can be prevented from having reduced plate thickness or from breaking due to the extension of the material 1001 in the circumferential direction, and therefore, the formability is improved. Further, when the magnetic pole sections 106A an 106B are moved in the radial direction of the rotating shaft, the inner diameter accuracy of the stator core 104 can be improved by pressing the end face of the magnetic pole sections 106A and 106B in the radial direction of the rotating shaft onto a tool. In the step of forming the material 1001 into a wave shape, the material can be a single sheet or in a laminated state.

FIG. 14 shows an example of a step for forming a material into a wave shape, wherein FIG. 14A shows the state prior to forming the material into a wave shape, and FIG. 14B shows a state after forming the same into a wave shape. For sake of better understanding, the front side area of the tool in the drawing at the upper side of the material 1001 is not shown, but actually, a tool is disposed in this area as in other portions in the circumferential direction. Furthermore, in the step for forming the material 1001 in a wave shape, the material can be a single sheet or in a laminated state, but in FIGS. 14A through 14C, the material 1001 is in a laminated state.

As shown in FIG. 14A, punches 1101 are arranged in the circumferential direction of the rotating shaft on the end faces of the magnetic pole sections 106A and 106B to be pressed in toward the axial direction, and counters 1102 are arranged so as to sandwich the material 1001 between the punches 1101. The counters 1102 apply power in the thickness direction of the sheet composing the material 1001 in an opposite direction from which the punches 1101 press the magnetic pole sections in the direction of the rotating shaft, to thereby restrain deformation of the material 1001 to the exterior of the plane. In the actual forming process, when the magnetic pole sections 106A are pressed in toward the rotor axis direction, the magnetic pole sections 106B must be restricted from moving in the rotor axis direction, or when the magnetic pole sections 106B are pressed in toward the rotor axis direction, the magnetic pole sections 106A must be restricted from moving in the rotor axis direction, but in the present description, since the magnetic pole sections 106A and 106B are to be relatively deformed in the rotor axis direction, the magnetic pole sections 106A are formed via a punch 1101A for pushing the same toward the rotor axis direction, and the magnetic pole sections 106B are formed via a punch 1101B for pushing the same toward the rotor axis direction.

Further, parts corresponding to the punches 1101A and 1101B are referred to as counters 1102A and 1102B. The punches 1101A and 1101B are arranged alternately around the circumferential direction of the rotor so that the direction in which the punches 1101A press the magnetic pole sections 106A toward the rotor axis direction and the direction in which the punches 1101B press the magnetic pole sections 106B toward the rotor axis direction are relatively opposite. Furthermore, counters 1102A and 1102B are also arranged alternately around the circumferential direction of the rotor to correspond to punches 1101A and 1101B. In this state, the punches 1101A and 1101B are relatively pushed toward the rotor axis direction so as to form a wave shape as shown in FIG. 12B. According to this method, the bending radius of the rear side sections 114 connecting the magnetic pole sections 106A and 106B are continuously increased toward the outer side in the radial direction of the rotor axis.

In the step of pushing the punches 1101 in the rotor axis direction, the formability can be improved by moving the magnetic pole sections 106 in the rotor axis direction. By reducing the frictional force among the material 1001, the punches 1101 and the counters 1102, and/or by enabling the punches and the counters 1102 to be moved freely in the radial direction of the rotor, and/or by moving the punches 1101 and the counters 110 forcibly via a cam mechanism in the radial direction of the rotor, drawbacks caused by the expansion of the material 1001 in the circumferential direction such as the reduction of sheet thickness and fracture can be suppressed, and the formability can be improved. Further, the inner diameter accuracy of the stator 104 can be improved by butting the end face of the magnetic pole sections 106 in the radial direction of the rotor against a stopper 1103 at a final stage when the magnetic pole sections 106 are deformed in the radial direction of the rotor.

The counter 1102 is used to ensure the flatness of the magnetic pole sections 106. Mold constructions such as die cushions, gas dampers or springs are used to apply opposing force with respect to the punch 1101. A forming method using a counter 1102 has been described, but since the magnetic pole sections 106 can be curved to realize the same performance, the counter 1102 can be omitted if it is not necessary to ensure the flatness of the magnetic pole sections 106. In that case, the magnetic pole sections 106A and 106B should simply be pressed using punches 1101A and 1101B, so that the forming process can be facilitated using a mold having a shape of a transferred waveform.

During the process for forming a waveform, when the magnetic pole sections 106 are moved toward the radial direction of the rotor, the shape of the material 1001 projected in the rotor axis direction will be varied before and after forming, so that the material 1001 prior to forming must have a shape having expanded the shape of the stator core 104 after forming. Since the shape of the magnetic pole sections 106 will not vary so much after the material is formed into a wave shape, the shape thereof can be the same as the shape of the stator core 104, but the length of the rear side section 114 must be set longer than the length of the stator core 104 projected in the rotor axis direction. Further, the length of the rear side section 114 must be increased as the amount of movement of the magnetic pole sections 106 in the radial direction of the rotor increases.

Now, the actual manufacturing method of the stator core 104 will be described. First, a material 1001 having multiple magnetic poles continuously connected in a strip shape is cut out from a steel sheet hoop material via a punching process. Next, the rear side section 112 of the material 1001 having multiple magnetic poles connected in a strip shape is bent in-plane via rolling, and the material is laminated spirally as shown in FIG. 13. After laminating a desired number of layers, the rear side section 112 of the material 1001 is welded via laser welding. Next, the laser-welded material 1001 is formed into the shape of a wave via a press, according to which a stator core 104 as shown in FIG. 5 is manufactured.

An annually-connected or spiral stator core 104 has been described, but now, a stator core 104 having been divided in the circumferential direction per a few magnetic poles will be described. From the viewpoint of electric characteristics, it is not necessary that the stator core 104 has an integral shape. FIGS. 15A through 15C show an example of a core shape composed of a pair of magnetic poles (two magnetic poles) constituting a magnetic circuit of the stator. FIG. 15A shows one pair of magnetic poles of the stator core 104 illustrated in FIGS. 3 through 5.

According to the structure of the dynamo-electric machine used as a motor or a power generator, the flow of flux from the rotor corresponding to one pair of magnetic poles covers the flux corresponding to one pair of magnetic poles on the rotor side, so that the flow of flux between adjacent magnetic pole pairs is not required. Therefore, characteristics equal to the stator core having an integrated shape can be satisfied by a core divided circumferentially into multiple parts. Therefore, by assembling core parts composed of teeth 106A and 106B as illustrated in FIG. 15A to constitute a stator core 104, a stator core having a structure as described earlier to be used in motors and power generators can be formed. Further, the same reference numbers denote portions having the same functions and effects as in the former description.

FIG. 15B has a shape in which flanges are formed to the leading ends of teeth 106A and/or teeth 106B of FIG. 15A. The flanges function to collect the flow of flux from the rotor effectively, and to prevent the wound stator winding 122 from protruding to the inner direction. FIG. 15C illustrates a core having a shape alternated in the axial directions, wherein the positional relationship of the magnetic poles are not superposed in the rotating shaft direction. The present embodiment devised the shape of the core so as to ensure a wide space for arranging the stator winding 122 and to simplify the shape of the stator winding 122 so as to improve the productivity and workability. The stator core 104 illustrated in FIGS. 3 through 5 or FIG. 17 have a laminated structure of magnetic thin sheets, but the structure thereof is not restricted to the laminated structure, and the stator core can also be manufactured by compacting a power magnetic core or the like, for example. However, the laminated steel sheet structure is more advantageous from the viewpoint of strength, reliability and magnetic characteristics. Though detailed descriptions of FIGS. 15B and 15C are omitted, the components denoted by the same reference numbers function in the same manner and exert the same effects.

FIGS. 16A and 16B illustrate concepts for manufacturing a stator core 104 corresponding to one phase worth of stator core using the core illustrated in FIG. 15B. Interpolar sections 124 of the stator winding 122 as shown in FIG. 6 are respectively inserted to slots 114 extending in the rotating shaft direction between teeth 106A and teeth 106B. Thereafter, the respective magnetic pole pairs of FIG. 16A are fixed via welding or the like to form a stator core 104A having an integral shape in the circumferential direction.

According to the structure illustrated in FIG. 16A or in FIGS. 1 through 5, slots 114 are disposed along the rotating shaft, and interpolar sections 124 of the stator winding 122 are inserted to the slots 114. On the other hand, according to the example shown in FIG. 16B, the teeth 106A and teeth 106B are completely displaced in the rotating shaft direction. According to this structure, the stator winding 122 can be inserted to the slots 114 without providing much flexure in the rotating shaft direction. Therefore, the stator winding 122 has superior productivity. Further, the stator winding 122 can be inserted to the slots 144 easily, according to which the stator winding has superior workability. However, the stator winding has drawbacks in that the cross-sectional area of the magnetic circuit facing the rotor is reduced and the output tends to be deteriorated. However, if it is not necessary for the output to be high, the stator winding is effective since the production cost is inexpensive.

The basic structure of the finally completed stator 102 is the same as that illustrated in FIG. 1 or FIGS. 2A through 2C, wherein the stator winding 122 is wound so as to extend back and forth between one end and the other end along the rotating shaft as shown in FIGS. 2B and 2C. The stator core 104 of the above drawing is partially overlapped at the center in the rotating shaft direction of the stator core 104 having teeth 106A and 106B displaced in the rotating shaft direction, which is substantially the same as the winding arrangement of a slot teeth-type dynamo-electric machine as shown in the cross section of FIG. 2C. Thus, the plane opposing to the rotor has an efficiently composed magnetic circuit, according to which superior electric characteristics can be obtained. On the other hand, the stator winding 122 is significantly simplified compared to the slot teeth-type dynamo-electric machine, according to which superior productivity can be obtained, and since the shape of the stator winding 122 is simple, the stator winding has superior safety and reliability.

FIG. 17 shows yet another embodiment of the stator winding 122. In the structure illustrated in FIGS. 1 and 2, the stator winding 122 is bent in a substantially orthogonal angle at a portion connecting the circumferential area with the rotating shaft direction area. In other words, the stator winding 122 has a portion substantially parallel with the rotating shaft. However, when an actual magnet wire with a coating is bent orthogonally, the resin coating for insulation may be damaged, so that it is necessary to pay special attention during operation. It is preferable to bend the wire with a certain curve R (radius). At this point, if shapes illustrated in FIG. 1 or FIGS. 2A through 2C are to be formed, it is preferable that special care is given in the operation for forming the stator winding 122.

According to the form illustrated in FIG. 17, slots 114 between teeth 106A and 106B are widened in the circumferential direction. The clearance between the magnetic poles of the core is widened so that the portion of the stator winding 122 extended in the rotating shaft direction can be arranged obliquely. This structure is advantageous since the curve R (radius) can be moderated, according to which the workability can be improved. However, the structures shown in FIG. 1 or FIGS. 2A through 2C have a higher ratio of area occupied by the stator winding 122 (ratio of cross-sectional area of the conductor with respect to the slot), according to which high output can be obtained easily. It is preferable from the viewpoint of improvement of efficiency so as not to reduce the ratio of area occupied by the stator winding 122 in the structure illustrated in FIG. 17.

FIGS. 18A through 18D show the cross-sectional view of a stator winding 122 capable of increasing the area occupation ratio thereof. Normally, as shown in FIG. 18A, a magnet wire having a round cross section is used as the winding, but it is possible to increase the area occupation ratio by using a rectangular magnet wire aligned as shown in FIG. 18B or 18C. Further, if the stator winding 122 is manufactured in advance as shown in FIG. 6, which is integrated with the stator core 104 thereafter, it is preferable to additionally provide a step for forming the cross-sectional shape of the stator winding 122 into a preferable shape. In the process of forming the cross-sectional shape of the stator winding 122, the area occupation ratio of the winding can be improved by forming the wire having a substantially round cross-sectional shape into a shape as illustrated in FIG. 18D.

[Application of the Stator to a Dynamo-Electric Machine Such as a Motor]

FIG. 19B is a perspective view of a dynamo-electric machine having the three-phase AC stator 100 illustrated in FIG. 7 applied to the dynamo-electric machine, and FIG. 19A is an expansion diagram of the dynamo-electric machine shown in FIG. 19B. A bearing 414 and a bearing 412 are respectively fixed to a front-side housing 418 and a rear-side housing 416, and a shaft 436 is supported in a rotatable manner via the bearings 414 and 412. A rotor 404 is fixed to the shaft 436. The three-phase AC stator 100 shown in FIG. 7 is disposed on the outer side of the rotor 404 with a clearance therebetween. By engaging the front-side housing 418 and the rear-side housing 416 via through bolts 452, the three-phase AC stator 100 can be fixed and supported between the front-side housing 418 and the rear-side housing 416. Further, an outer ring 401 formed of aluminum material or the like is disposed on the outer circumference of the three-phase AC stator 100, by which the dynamo-electric machine is airtightly sealed.

The above-described three-phase AC stator 100 operates as a power generator or as a motor by being combined with various rotors, and can be applied to various uses. In any application, the three-phase AC stator 100 has superior productivity since the design of the stator 100, especially the design of the stator winding 122, is simple. According to the above-described embodiment, the coil end of the stator winding 122 in the axial direction can either be minimized or eliminated, according to which the stator can be downsized and copper loss can be minimized.

The invention claimed is:

1. A stator core for a dynamo-electric machine having a rotor supported in a rotatable manner, and a stator having at least two stator cores aligned in a rotating shaft direction of the rotor, the stator core comprising:

a plurality of magnetic poles of the stator core arranged in a circumferential direction of the rotating shaft of the rotor, and stator core slots formed in an axial direction of the rotating shaft between the respective magnetic poles of the plurality of magnetic poles;

wherein the respective magnetic poles arranged in the circumferential direction have end faces in the axial direction of the rotating shaft formed in a shape of a wave with respect to adjacent magnetic poles in the axial direction of the rotating shaft, so that a stator winding can be arranged in the slots formed on the side of the inner end faces of the magnetic poles arranged in the shape of a wave and in the axial direction of the rotating shaft, and wherein the magnetic poles of the plurality of stator cores arranged in the circumferential direction of the rotating shaft are formed of steel sheets laminated in the axial direction of the rotating shaft.

2. The stator core for a dynamo-electric machine according to claim 1, wherein a bend radius of a rear side section of the stator connecting the adjacent magnetic poles is gradually increased in a continuous manner from the rotating shaft of the rotor toward the outer side in the radial direction of the rotor.

3. A manufacturing method of a stator core for a dynamo-electric machine comprising:

a step one for cutting out a material from a steel sheet, a step two for laminating the material, a step three for joining the material, and a step four for forming the material in a shape of a wave, wherein steps one through four are combined to form a plurality of magnetic poles of a stator core in the circumferential direction of a rotating shaft of the dynamo-electric machine, to form slots in an axial direction of the rotating shaft between the respective magnetic poles of the plurality of magnetic poles, and to form end faces in the axial direction of the rotating shaft of the respective magnetic poles arranged in the circumferential direction so that the adjacent magnetic poles are alternately displaced in a shape of a wave in the axial direction of the rotating shaft.

4. The manufacturing method of a stator core for a dynamo-electric machine according to claim 3, wherein the material being cut out in step one is laminated in step two, the material being laminated in step two is joined in step three, and the material being joined in step three is formed into the shape of a wave in step four.

5. The manufacturing method of a stator core for a dynamo-electric machine according to claim 3, wherein the material being cut out in step one is laminated in step two, the material being laminated in step two is formed in the shape of a wave in step four, and the material being formed in the shape of a wave in step four is joined in step three.

6. The manufacturing method of a stator core for a dynamo-electric machine according to claim 3, wherein the material being cut out in step one is formed in the shape of a wave in step four, the material being formed in the shape of a wave in step four is laminated in step two, and the material being laminated in step two is joined in step three.

7. The manufacturing method of a stator core for a dynamo-electric machine according to claim 3, wherein in step four, an end face of the magnetic pole in the rotor axis direction is relatively pressed toward a rotating shaft direction of the rotor with respect to an end face of an adjacent magnetic pole in the rotor axis direction.

8. The manufacturing method of a stator core for a dynamo-electric machine according to claim 3, wherein in step four, the magnetic pole is moved toward a center of a radial direction of the rotating shaft of the rotor.

9. The manufacturing method of a stator core for a dynamo-electric machine according to claim 3, wherein in step four, a center-side face of the magnetic pole in the radial direction of the rotating shaft of the rotor is butted against a tool.

10. The manufacturing method of a stator core for a dynamo-electric machine according to claim 3, wherein in step four, at least two methods selected from the following methods are performed in a single step, which are a method for pressing an end face of the magnetic pole in the rotor axis direction relatively toward a rotating shaft direction of the rotor with respect to an end face of an adjacent magnetic pole in the rotor axis direction, a method for moving the magnetic pole toward a center of a radial direction of the rotating shaft of the rotor, and a method for butting a center-side face of the magnetic pole in the radial direction of the rotating shaft of the rotor against a tool.

11. The manufacturing method of a stator core for a dynamo-electric machine according to claim 3, wherein in step one, the material is cut either into an annularly connected shape, or into a strip shape in which one or a plurality of magnetic poles of the stator are connected.

12. The manufacturing method of a stator core for a dynamo-electric machine according to claim 3, wherein in step two, sheet materials being cut into an annularly connected shape are laminated, or sheet materials in which one or a plurality of magnetic poles of the stator connected in a strip shape are laminated, or sheet material connected in a strip shape is spirally laminated.

13. The manufacturing method of a stator core for a dynamo-electric machine according to claim 3, wherein in step three, the sheet members are joined via engaging and clinching an projected section and a recessed section formed thereto by half blanking, or via laser welding, TIG welding, or adhesive bonding.

* * * * *